(12) United States Patent
Yoshida

(10) Patent No.: US 6,654,138 B1
(45) Date of Patent: Nov. 25, 2003

(54) COMMUNICATION APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/294,207

(22) Filed: Apr. 20, 1999

(30) Foreign Application Priority Data

Apr. 22, 1998 (JP) .......................................... 10-128193

(51) Int. Cl.⁷ .......................................... G06F 15/00
(52) U.S. Cl. .................................. 358/1.15; 358/1.13
(58) Field of Search .................. 358/1.1, 1.5, 1.12, 358/1.13, 1.14, 1.15, 1.8, 1.16, 1.17

(56) References Cited

U.S. PATENT DOCUMENTS

| | | | |
|---|---|---|---|
| 5,075,783 A | 12/1991 | Yoshida et al. | 358/439 |
| 5,128,985 A | 7/1992 | Yoshida et al. | 379/100 |
| 5,208,681 A | 5/1993 | Yoshida | 358/404 |
| 5,227,894 A | 7/1993 | Yoshida | 358/441 |
| 5,497,247 A | 3/1996 | Yoshida | 358/436 |
| 5,547,178 A * | 8/1996 | Costello | 270/52.02 |
| 5,684,606 A | 11/1997 | Yoshida | 358/437 |
| 5,892,815 A | 4/1999 | Yoshida et al. | 379/100.16 |
| 5,930,005 A | 7/1999 | Yoshida | 358/448 |

FOREIGN PATENT DOCUMENTS

| | | |
|---|---|---|
| JP | 62-79531 | 5/1987 |
| JP | 63-187463 | 11/1988 |
| JP | 2-276359 | 11/1990 |
| JP | 5-193769 | 8/1993 |
| JP | 8-23413 | 1/1996 |
| JP | 9-9042 | 1/1997 |
| JP | 9-18644 | 1/1997 |
| JP | 9-116680 | 5/1997 |
| JP | 10-65898 | 3/1998 |

* cited by examiner

Primary Examiner—Mark Wallerson
(74) Attorney, Agent, or Firm—Fitzpatrick, Cella, Harper & Scinto

(57) ABSTRACT

In a communication apparatus connectable to a plurality of lines, a plurality of cassettes are each adapted to contain recording sheets. For each line of the plurality of lines, a cassette is set to be used in a reception operation. In a case in which a cassette to be used corresponding to a line does not contain a recording sheet, received information is stored in a memory regardless of whether another cassette corresponding to another line contains a recording sheet.

16 Claims, 39 Drawing Sheets

| |
|---|
| CHANGE BIN 2 TO BIN 1 IN S108 AND S120 |
| CHANGE COMM NUMBER 2 TO COMM NUMBER 1 IN S124, S128 AND S130 |
| CHANGE BIN 3 TO BIN 2 IN S148 AND S160 |
| CHANGE COMM NUMBER 3 TO COMM NUMBER 2 IN S164, S168 AND S170 |
| CHANGE BIN 4 TO BIN 2 IN S188 AND S200 |
| CHANGE COMM NUMBER 4 TO COMM NUMBER 2 IN S204, S208 AND S210 |

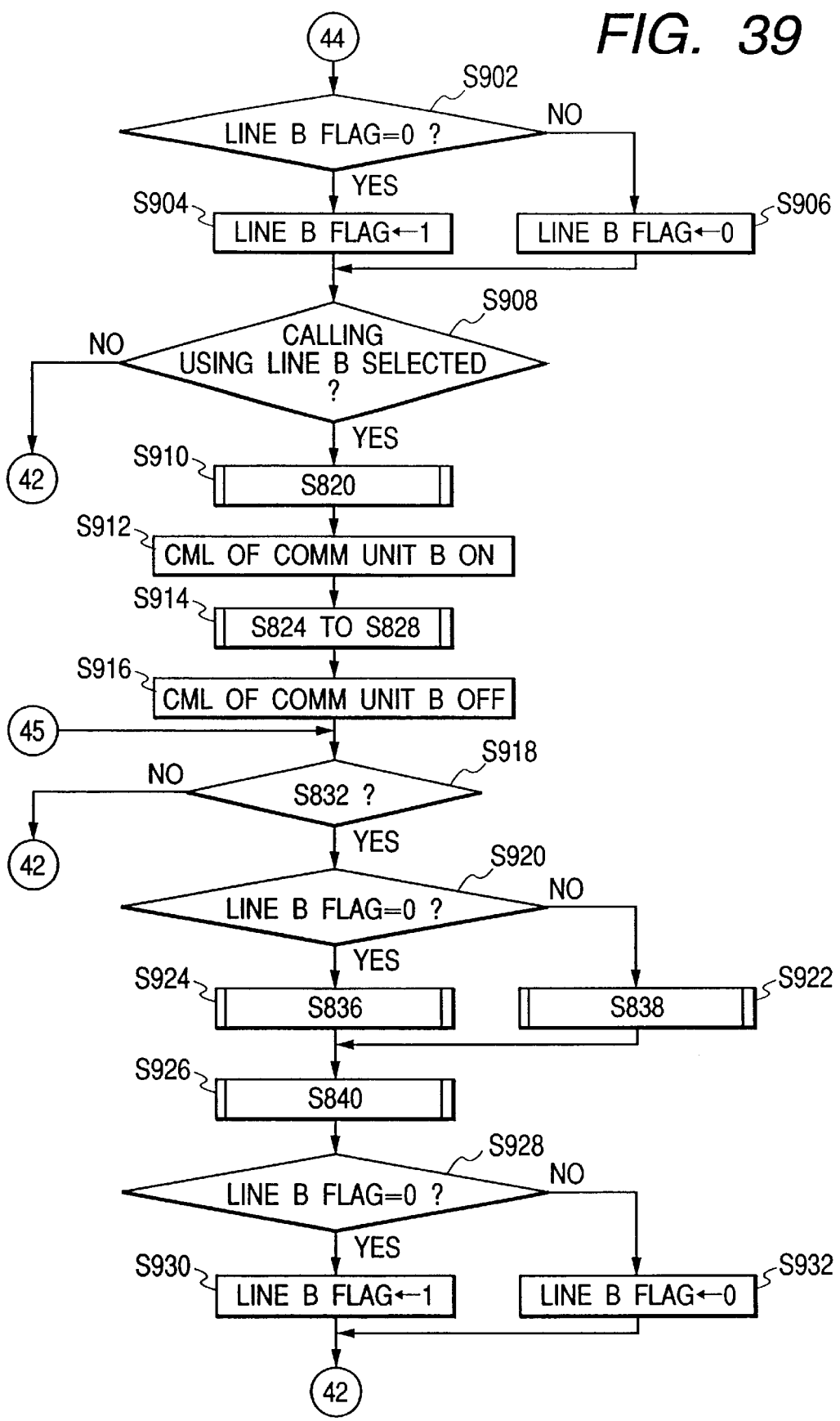

COMMUNICATION APPARATUS

BACKGROUND OF THE INVENTION

1. Field of the Invention

The present invention relates to a communication apparatus capable of accommodating plural communication lines.

2. Related Background Art

As the communication apparatus capable of accommodating plural communication lines, there is conventionally known for example a facsimile apparatus. Such facsimile apparatus receives and records the facsimile information received from any line in the same manner.

For example, in case there are provided two lines, the information received from these lines are not particularly distinguished such as the reception from a line A and that from a line B.

Consequently, in case a facsimile apparatus accommodating plural telephone lines is purchased and utilized by plural companies or organizations, it is a hard job to distribute the received information.

Also the communication report issued for a predetermined number of communications is not easily understandable as it contains the transmissions and receptions on all the lines.

SUMMARY OF THE INVENTION

In consideration of the foregoing, an object of the present invention is, in the facsimile apparatus capable of accommodating plural communication lines, to effectively process the reception information in each line and to enable efficient distribution of the received and recorded documents and the communication result report.

BRIEF DESCRIPTION OF THE DRAWINGS

FIGS. 29, 30, 31, 32, 33, 34, 35, 36, 37, 38 and 39 are flow charts showing the function of the second embodiment.

DESCRIPTION OF THE PREFERRED EMBODIMENTS

Figure 1:
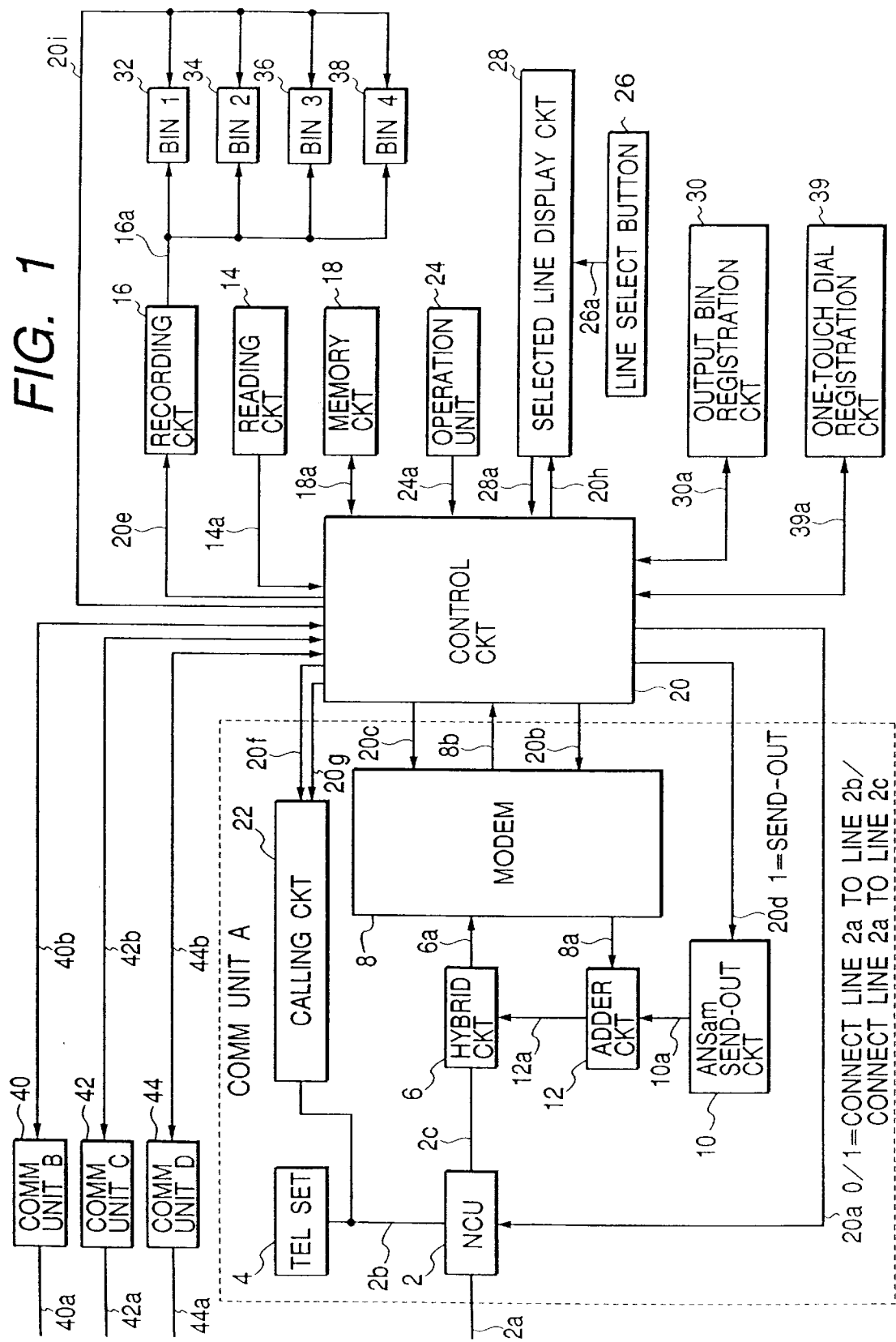
FIG. 1 is a block diagram showing first and second embodiments of the present invention.

FIG. 1 is a block diagram showing the configuration of a facsimile apparatus constituting first and second embodiments of the present invention.

An NCU (network control unit) 2 is provided for utilizing a telephone network for data communication by effecting connection to a terminal of a telephone line, connection control of a telephone exchange network, switching to data communication channel, loop holding etc. Also the NCU 2 connects a telephone line 2a to a telephone set 4 or to the facsimile apparatus according as a signal level on a signal line 20a from a control circuit 20 is "0" or "1". In the normal state, the telephone line 2a is connected to the telephone set.

A hybrid circuit 6 separates transmission signals and reception signals, and executes transmission of the transmission signal from an adder circuit 12 to the telephone line 2a through the NCU 2, and transfer of the signal, received from a communication partner through the NCU 2, to a modem 8 through a signal line 6a.

The modem 8 executes modulation and demodulation according to the ITU-T recommendation V.8, V.21, V.27 ter, V.29, V.17 and V.34, and each transmission mode is designated by a signal line 20c. The modem 8 receives a signal on a signal line 20b to output modulated data on a signal line 8a, and receives a signal on the signal line 6a to output demodulated data on a signal line 8b.

An ANSam transmission circuit 10, for outputting an ANSam signal, outputs the ANSam signal or none to a signal line 10a according as the signal level on a signal line 20d is "1" or "0".

The adder circuit 12 receives information on the signal lines 8a and 10a and outputs the result of addition to a signal line 12a. A reading circuit 14 reads an image of an original and outputs read image data on a signal line 14a. A recording circuit 16 records information on a signal line 20e in succession, line by line.

A memory circuit 18 is used for storing the original or encoded information of the read data, or the received or demodulated information.

A calling circuit 22 receives telephone number information on a signal line 20f and outputs a selection signal to a signal line 2b when a call command pulse is generated on a signal line 20g.

An operation unit 24 is provided with a one-touch dial, a shortened dial, numeral keys, "*" and "#" keys, a set key, a start key, registration keys to circuits 30, 39 and other function keys, and information of a depressed key is outputted to a signal line 24a.

A selection button 26 is used for selecting a line (A, B, C or D) to be used for calling and the depression of this button generates a pulse on a signal line 26a.

A display circuit 28 is used for displaying a line to be used in telephone calling. It displays "line A selected" when a clear pulse is generated on a signal line 20h, and displays "line B selected", "line C selected", "line D selected" or "line A selected" in succession upon every generation of a depression pulse on the signal line 26a. Also it outputs a signal "A" on a signal line 28a when "line A selected" is displayed, and similarly outputs a signal "B", "C" or "D" on the signal line 28a according as "line B selected", "line C selected" or "line D selected" is displayed.

A registration circuit 20 registers an output bin according to a line, and the registration is executed through a signal line 30a. For example, in the first embodiment to be explained later, a first bin (bin 1) 32 is registered for the transmission, reception and communication report through the line A. Similarly a second bin (bin 2) 34, a third bin (bin 3) 36 and a fourth bin (bin 4) 38 are registered for those through the line B, C and D, respectively. Also in the second embodiment to be explained later, the first bin 32 is registered for the transmission, reception and communication report through the lines A and B, while the second bin 35 is registered for those through the lines C and D.

The first to fourth bins 32 to 38 respectively store recorded sheets. When a signal "1" is provided on a signal line 20i, the recorded sheet (received and recorded original) outputted from the recording circuit 16 is stored in the first bin 32. Similarly, when a signal "2", "3" or "4" is provided on the signal line 20i, the recorded sheets outputted from the recording circuit 16 is stored in the second bin 34, third bin 36 or fourth bin 38, respectively. A signal line 16a schematically indicates a path of the recorded sheet outputted from the recording circuit 16.

A one-touch dial registration circuit 39, for registering the one-touch dial, is used for registering the telephone number and the line A, B, C or D to be selected, corresponding to the one-touch dial through a signal line 39a.

In the foregoing description, the signal line 2a corresponds to the first telephone line A, and a first communication unit A is constituted by the telephone set 4, the hybrid circuit 6, the modem 8, the ANSam transmission circuit 10, the adder circuit 12 and the calling circuit 22.

A second communication unit B 40 has a configuration similar to that of the communication unit A, and a signal line 40a corresponds to the second telephone line B. A signal line 40b is a control line equivalent to that between the communication unit A and the control circuit 20.

A third communication unit C 42 has a configuration similar to that of the communication unit A, and a signal line 42a corresponds to the third telephone line C. A signal line 42b is a control line equivalent to that between the communication unit A and the control circuit 20.

A fourth communication unit D 44 has a configuration similar to that of the communication unit A, and a signal line 44a corresponds to the fourth telephone line D. A signal line 44b is a control line equivalent to that between the communication unit A and the control circuit 20.

The control circuit 20 in the facsimile apparatus accommodating plural (for example 4) lines of the first embodiment of the present invention serves to register the output bin corresponding to each line in the registration circuit 30 and, at the receiving operation, to determine the bin for output based on thus registered information. It is assumed that the registration in the registration circuit 30 is so made as to output the received sheet of the line A to the first bin, and to similarly output the received sheet of the line B, C or D respectively to the second, third or fourth bin.

In issuing a call, the line to be used for such call can be designated among plural lines, and the report indicating the result of each communication and the report indicating the results of a predetermined number of communications can be outputted for each line. Thus, the report indicating the result of a communication utilizing the line A and the report indicating the results of a predetermined number of communications utilizing the line A are outputted in the first bin, and, these reports utilizing the line B, C or D are similarly outputted respectively to the second, third or fourth bin.

FIGS. 2 to 8 are flow charts showing the control sequence of the control circuit 20 in the first embodiment of the present invention.

Figure 2:
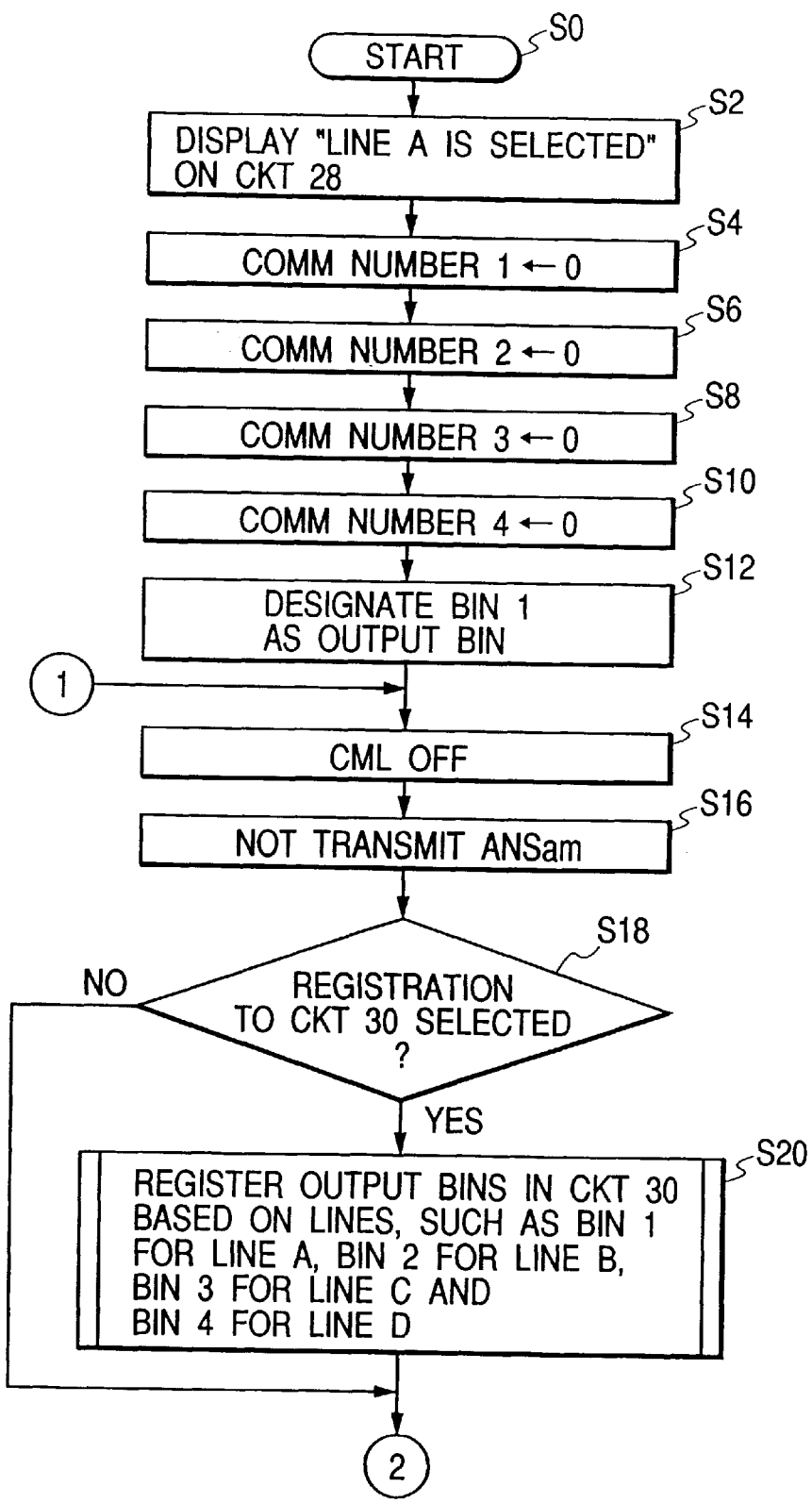
FIGS. 2, 3, 4, 5, 6, 7 and 8 are flow charts showing the function of the first embodiment.
Figure 3:
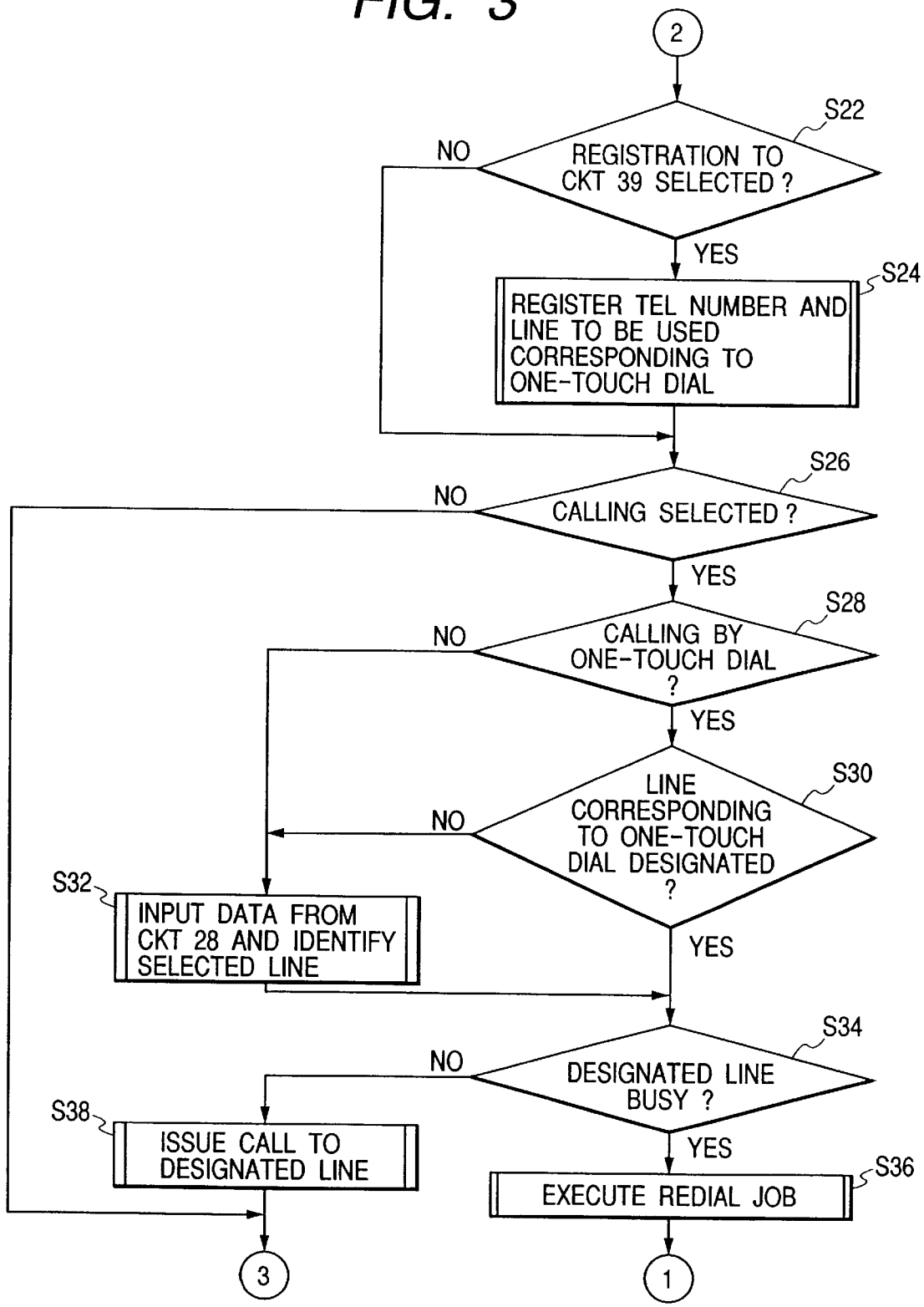
Figure 4:
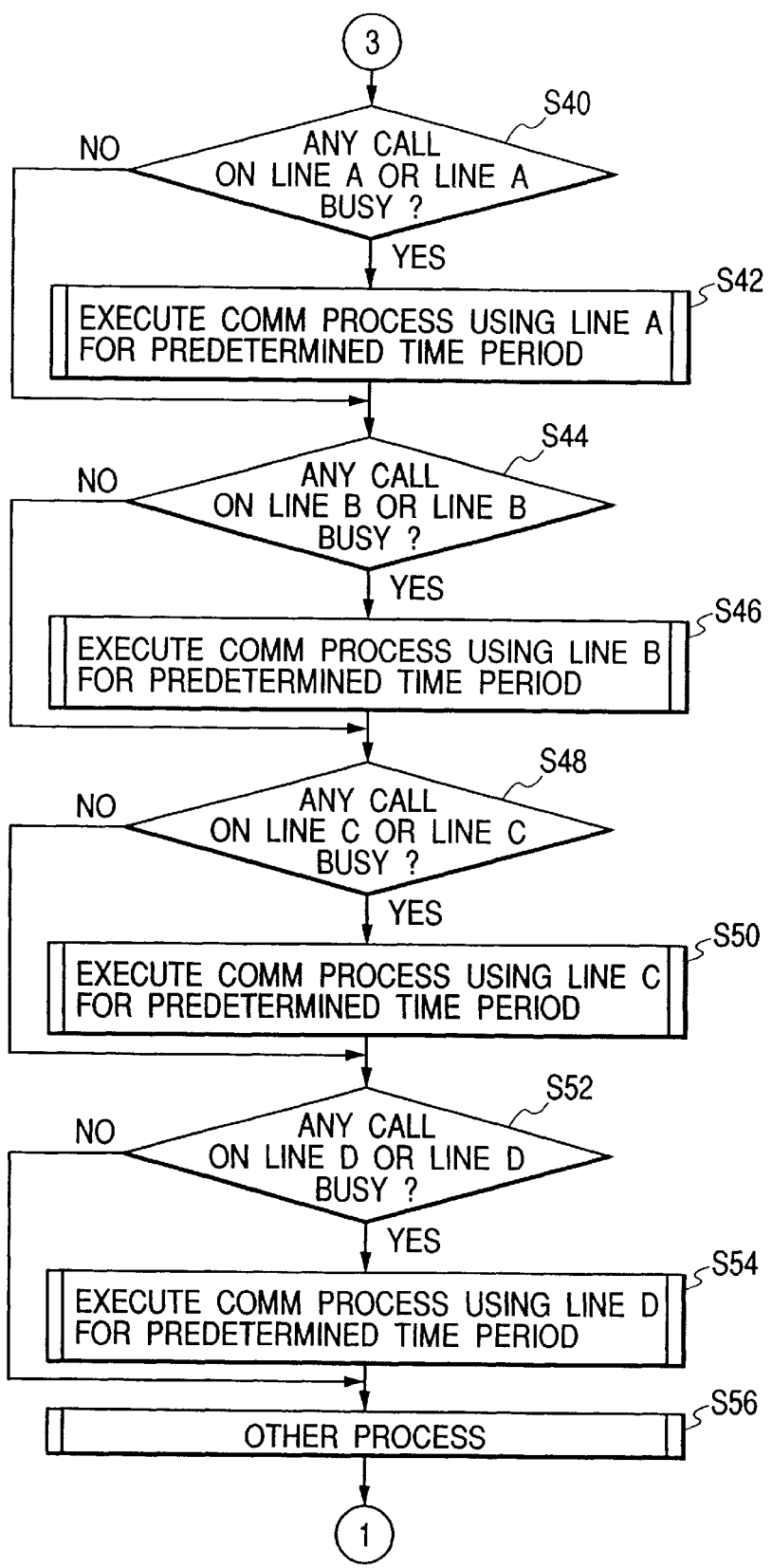

Referring to FIG. 2, a step S0 starts the sequence, and a step S2 generates a clear pulse on the signal line 20h to display "line A selected" on the circuit 28. A step S4 clears a communication number 1 corresponding to the first bin. Steps S6, S8 and S10 similarly clear the communication numbers 2, 3, 4 corresponding to the second, third and fourth bins.

A next step S12 outputs a signal "1" to the signal line 20i, thus designating the output of the reception sheet to the first bin. A step S14 turns off all the CML's of the communication units A, B, C and D. A step S16 sets all the communication units A, B, C and D in a state not transmitting the ANSam signal.

Then a step S18 receives the information on the signal line 24a to discriminate whether the registration in the registration circuit 30 is selected, and, if selected, the sequence proceeds to a step S20 for registering the output bin in the registration circuit 30 based on the information on the signal line 30a, for example the first, second, third and fourth bins respectively for the lines A, B, C and D. Then the sequence proceeds to a step S22. On the other hand, if the registration is not selected, the sequence directly proceeds to the step S22.

The step S22 enters the information of the signal line 24a for discriminating whether the registration in the one-touch dial registration circuit 39, and, if selected, the sequence proceeds to a step S24 for registering the telephone number and the line to be used (line A, B, C or D) in the one-touch dial registration circuit 39 corresponding to the one-touch dial based on the signal line 39a, but, if the registration is not selected, the sequence proceeds to a step S26.

The step S26 discriminates whether a call making is selected, and, the sequence proceeds to a step S28 or S40 respectively if a call making is selected or not.

The step S28 discriminates whether the call making is by the one-touch dial, and, the sequence proceeds to a step S30 or S32 respectively if the call making is by the one-touch dial or not.

The step S30 enters the information of the signal line 39a and discriminates whether the line to be used for one-touch dialing is designated, and the sequence proceeds to a step S34 or S32 according as the line is designated or not.

The step S32 enters the information of the display circuit 28 through the signal line 28a to recognize the selected line, and the sequence then proceeds to the step S34.

The step S34 discriminates whether the designated line is currently in use, and, if in use, the sequence proceeds to a step S36 for setting a redial job (JOB) and then to the step S14.

If the line is not in use, the sequence proceeds to a step S38 for making a call to the designated line, utilizing the calling circuit 22.

The step S40 discriminates whether the line A is in a state of receiving a call or being used, and, if the result of discrimination is affirmative, the sequence proceeds to a step S42 for executing a communication utilizing the line A for a predetermined time and then to a step S44, but, if the result is negative, the sequence proceeds directly to the step S44.

The step S44 discriminates whether the line B is in a state of receiving a call or being used, and, if the result of discrimination is affirmative, the sequence proceeds to a step S46 for executing a communication utilizing the line B for a predetermined time and then to a step S48, but, if the result is negative, the sequence proceeds directly to the step S48.

The step S48 discriminates whether the line C is in a state of receiving a call or being used, and, if the result of discrimination is affirmative, the sequence proceeds to a step S50 for executing a communication utilizing the line C for a predetermined time and then to a step S52, but, if the result is negative, the sequence proceeds directly to the step S52.

The step S52 discriminates whether the line D is in a state of receiving a call or being used, and, if the result of discrimination is affirmative, the sequence proceeds to a step S54 for executing a communication utilizing the line D for a predetermined time and then to a step S56, but, if the result is negative, the sequence proceeds directly to the step S56. A step S56 executes other processes and the sequence proceeds to the step S14.

Figure 5:
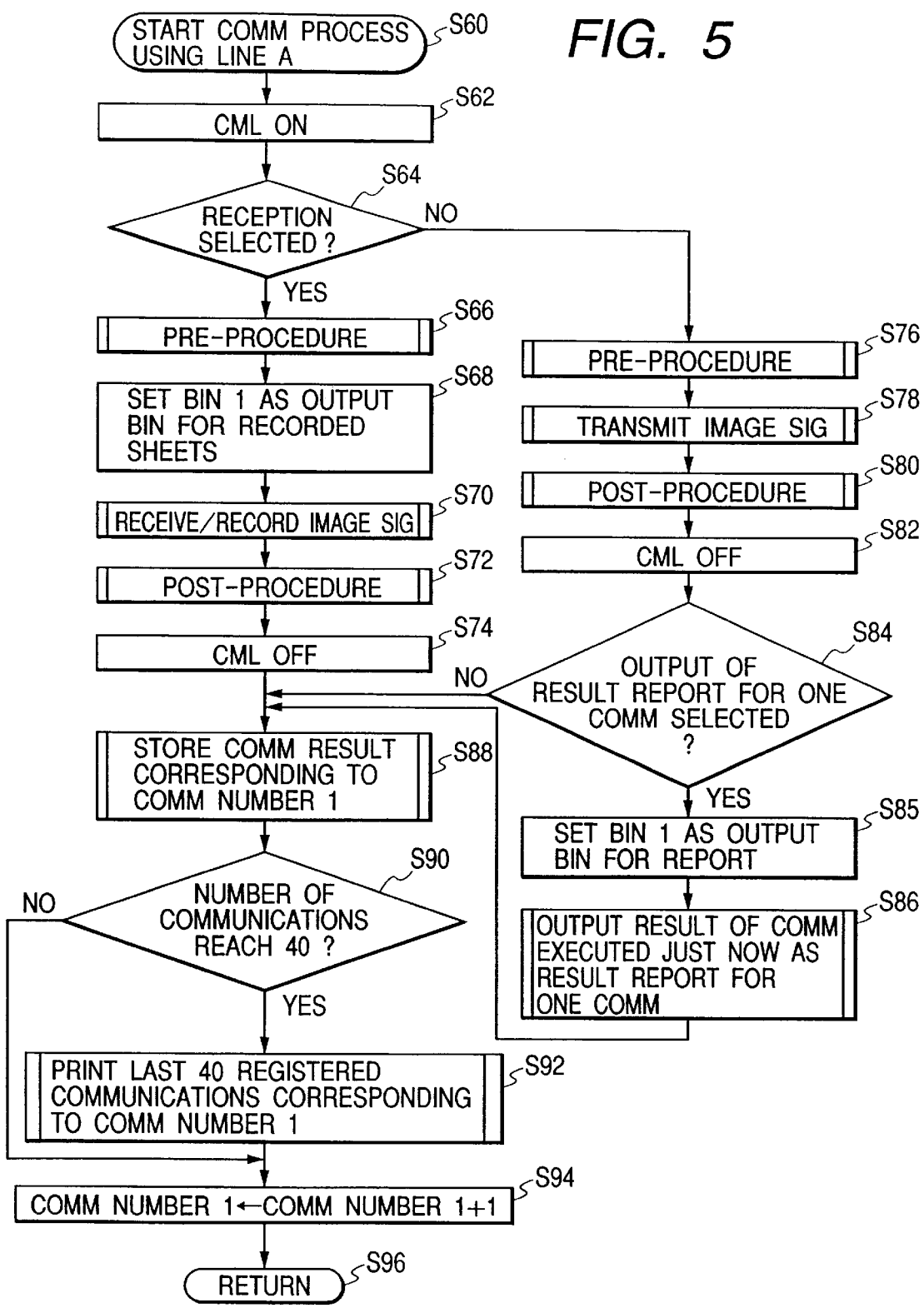

A step S60 in FIG. 5 starts a communication process A, called from the step S42. A step S62 turns on the CML of the communication unit A, then a step S64 discriminates whether the reception is selected, and the sequence proceeds to a step S66 or S76 according as the reception or transmission is selected.

The step S66 executes a pre-procedure, and a step S68 outputs a signal "1" to the signal line 20i for outputting the reception sheet to the first bin. A step S70 executes reception/recording of the image signal, then a step S72 executes a post-process, and a step S74 turns off the CML of the communication unit A. Then the sequence proceeds to a step S88.

The step S76 executes a pre-process, then a step S78 executes transmission of the image signal, and a step S80 executes a post-procedure. Then a step S82 turns off the CML of the communication unit A, then a step S84 discriminates whether the output of the communication result report of a communication is selected by an unrepresented switch, and, if not selected, the sequence proceeds to the step S88.

On the other hand, if selected, the sequence proceeds to a step S85 for outputting a signal "1" to the signal line 20i to output the report to the first bin, and a step S86 outputs the result of the communication that has just been executed as a communication result report of a communication. Then the sequence proceeds to the step S88.

The step S88 memorizes the result of communication, corresponding to the communication number 1. Then a step S90 discriminates whether the number of communications has reached 40, and, if the number has reached 40, the sequence proceeds to a step S92 for printing the results of the recent 40 communications registered corresponding to the communication number 1, and the sequence then proceeds to a step S94. A step S94 increases the value of the communication number 1 by one, and the sequence returns to the main flow from a step S96.

Figure 6:
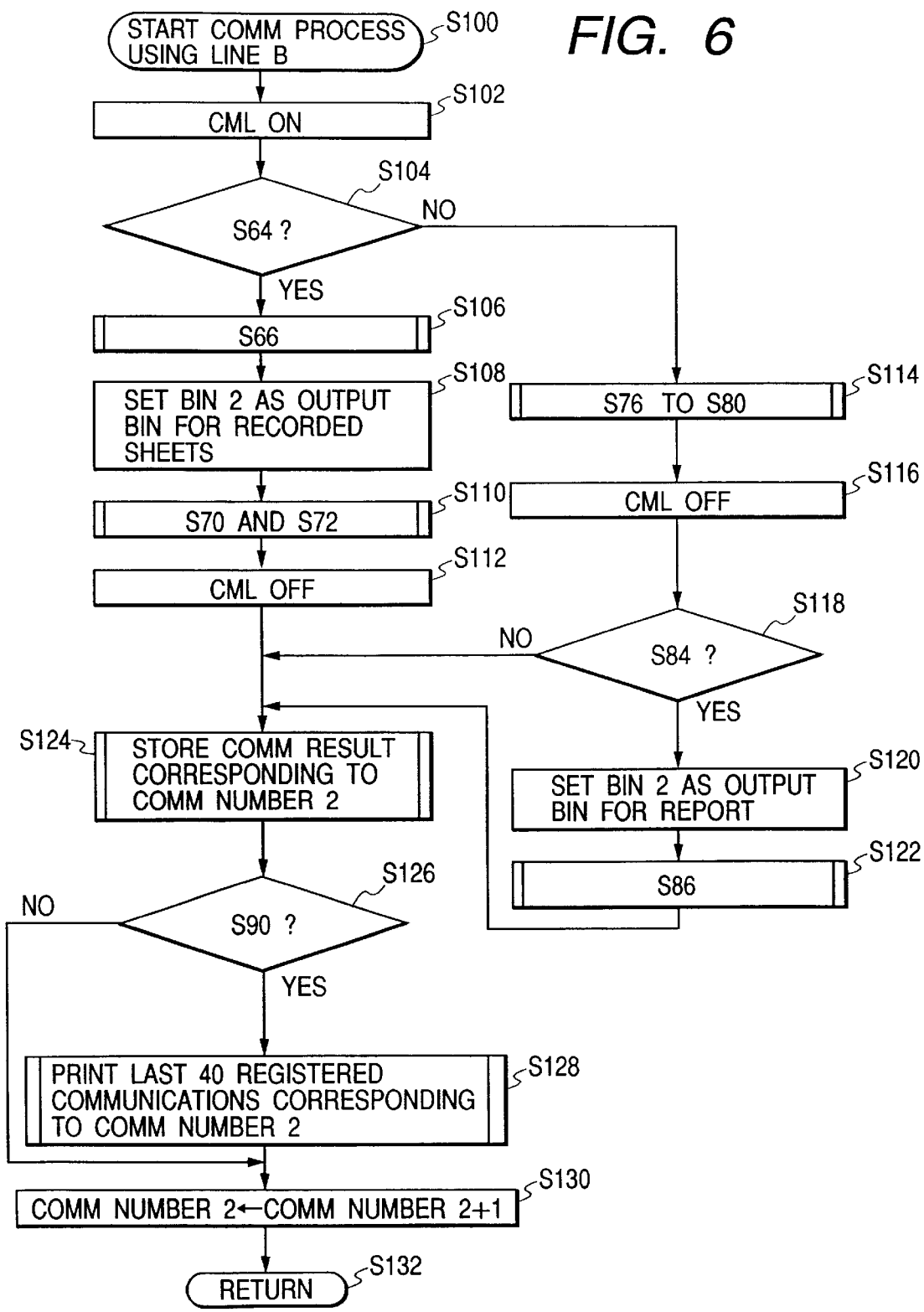

A step S100 in FIG. 6 starts a communication process B called from the step S46. In the following there will be only explained the differences from the sequence shown in FIG. 5 (steps in FIG. 6 same as those in FIG. 5 being represented by the step numbers therein).

A step S102 turns on the CML of the communication unit B, then steps S104 and S106 executes operations of the steps S64 and S66, and a step S108 outputs a signal "2" to the signal line 20i for outputting the received information to the second bin.

Subsequently a step S110 executes the operations of the steps S70 and S72, then a step S112 turns off the CML of the communication unit B, and the sequence proceeds to a step S124.

A step S114 executes the operations of the steps S76 to S80, and a step S116 turns off the CML of the communication unit B. A step S118 executes the operation of the step S84, and a step S120 outputs a signal "2" to the signal line 20i for outputting the report to the second bin. Then a step S122 executes the operation of the step S86 and the sequence proceeds to the step S124.

The step S124 memorizes the result of communication, corresponding to the communication number 2. Subsequently a step S126 executes discrimination of the step S90, and, if the result is affirmative, a step S128 prints the results of the recent 40 communications corresponding to the communication number 2, and the sequence proceeds to a step S130. On the other hand, if the result is negative, the sequence directly proceeds to the step S130.

The step S130 increases the value of the communication number 2 by one, and the sequence returns to the main flow from a step S132.

Figure 7:
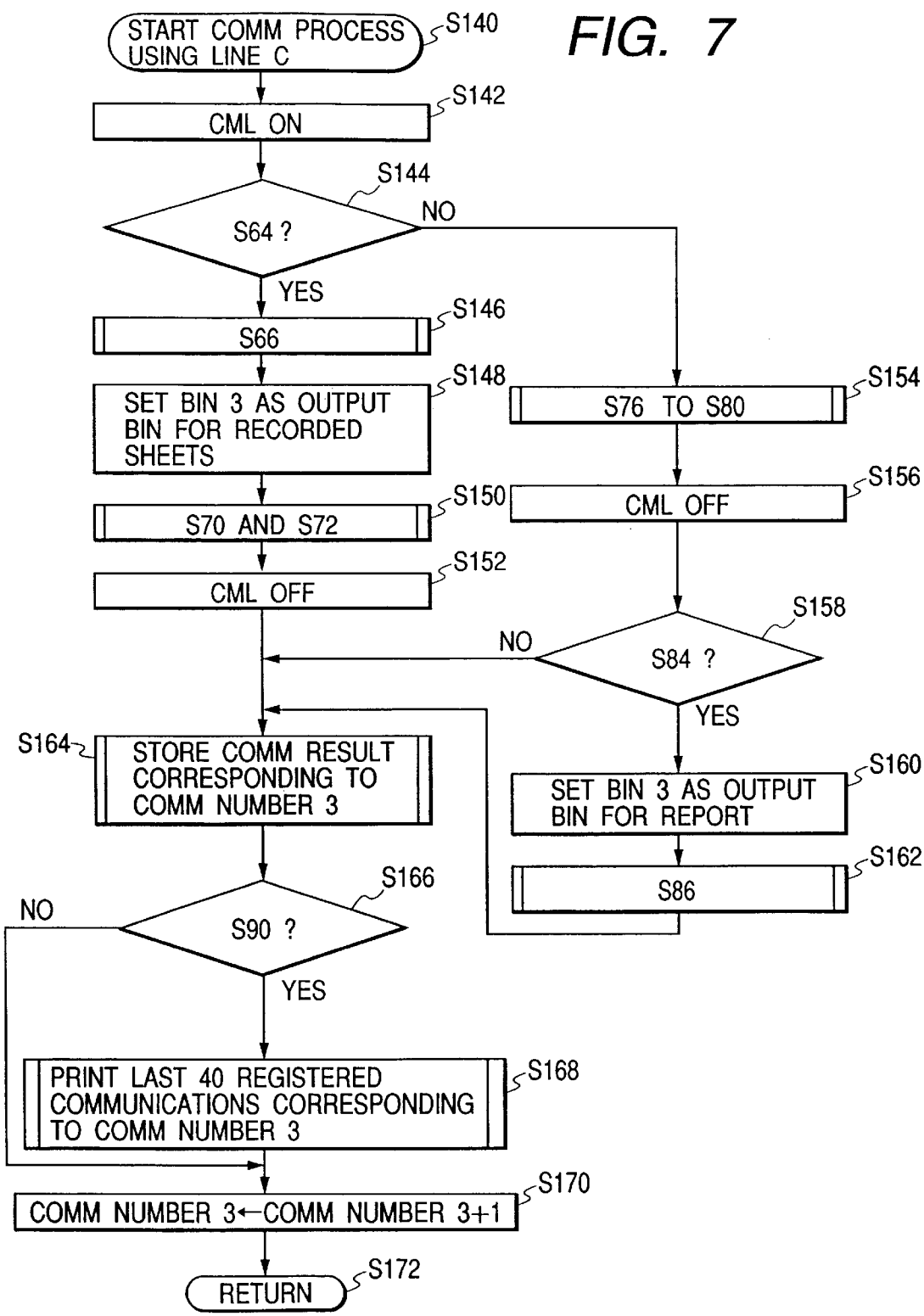

A step S140 in FIG. 7 starts a communication process C called from the step S60. In the following there will be only explained the differences from the sequence shown in FIG. 5 (steps in FIG. 7 same as those in FIG. 5 being represented by the step numbers therein).

A step S142 turns on the CML of the communication unit C, then steps S144 and S146 executes operations of the steps S64 and S66, and a step S148 outputs a signal "3" to the signal line 20i for outputting the received information to the third bin.

Subsequently a step S150 executes the operations of the steps S70 and S72, then a step S152 turns off the CML of the communication unit B, and the sequence proceeds to a step S164.

A step S154 executes the operations of the steps S76 to S80, and a step S156 turns off the CML of the communication unit C. A step S158 executes the operation of the step S84, and a step S160 outputs a signal "3" to the signal line 20i for outputting the report to the third bin. Then a step S162 executes the operation of the step S86 and the sequence proceeds to the step S164.

The step S164 memorizes the result of communication, corresponding to the communication number 3. Subsequently a step S166 executes discrimination of the step S90, and, if the result is affirmative, a step S168 prints the results of the recent 40 communications corresponding to the communication number 3, and the sequence proceeds to a step S170. On the other hand, if the result is negative, the sequence directly proceeds to the step S170.

The step S170 increases the value of the communication number 3 by one, and the sequence returns to the main flow from a step S172.

Figure 8:
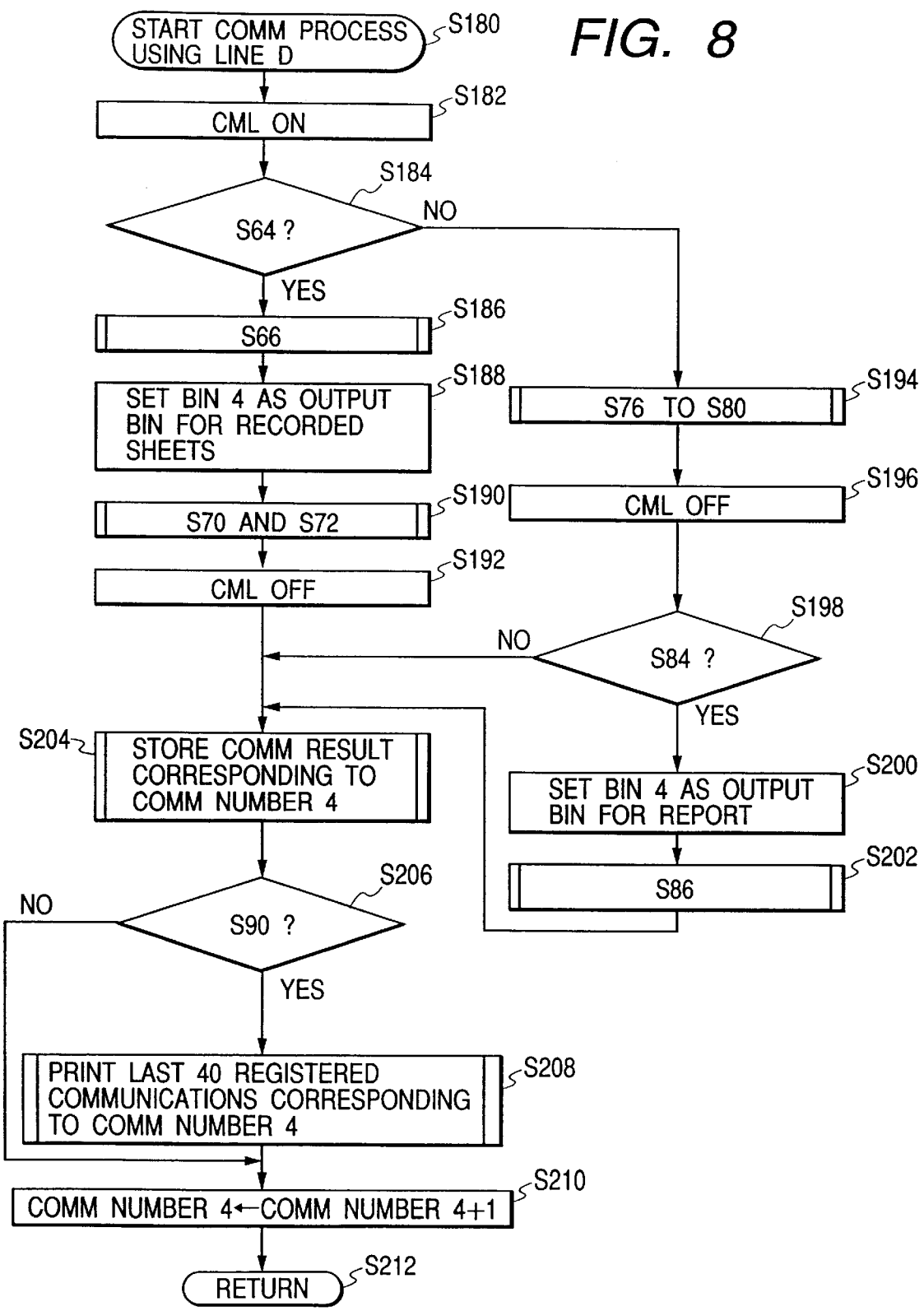

A step S180 in FIG. 8 starts a communication process D called from the step S54. In the following there will be only explained the differences from the sequence shown in FIG. 5 (steps in FIG. 8 same as those in FIG. 5 being represented by the step numbers therein).

A step S182 turns on the CML of the communication unit D, then steps S184 and S186 executes operations of the steps S64 and S66, and a step S188 outputs a signal "4" to the signal line 20i for outputting the received information to the fourth bin.

Subsequently a step S190 executes the operations of the steps S70 and S72, then a step S192 turns off the CML of the communication unit D, and the sequence proceeds to a step S204.

A step S194 executes the operations of the steps S76 to S80, and a step S196 turns off the CML of the communication unit D. A step S198 executes the operation of the step S84, and a step S200 outputs a signal "4" to the signal line 20i for outputting the report to the fourth bin. Then a step S202 executes the operation of the step S86 and the sequence proceeds to the step S204.

The step S204 memorizes the result of communication, corresponding to the communication number 4. Subsequently a step S206 executes discrimination of the step S90, and, if the result is affirmative, a step S208 prints the results of the recent 40 communications corresponding to the communication number 4, and the sequence proceeds to a step S210. On the other hand, if the result is negative, the sequence directly proceeds to the step S210.

The step S210 increases the value of the communication number 4 by one, and the sequence returns to the main flow from a step S212.

In the following there will be explained a second embodiment of the present invention.

In the second embodiment, in contrast to the first embodiment, there is assumed a configuration having only first and second bins, wherein the communication utilizing the line A or B is outputted to the first bin while that utilizing the line C or D is outputted to the second bin, and the communication result report of a communication and that of a predetermined number of communications are outputted in the respective bin.

Figures 9A, 9B:
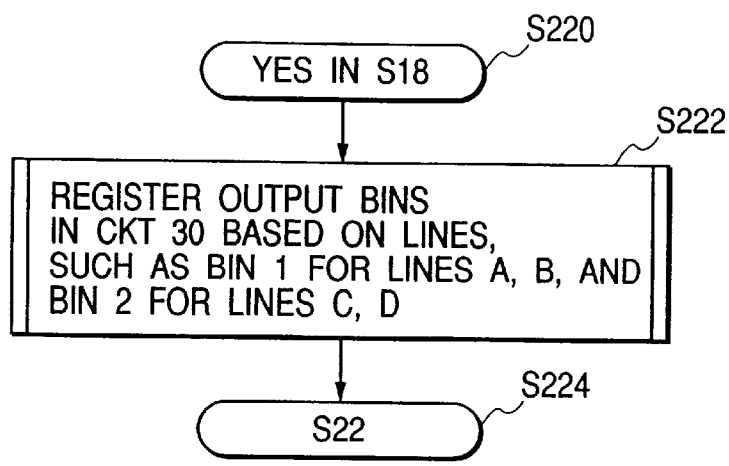
FIGS. 9A and 9B are views showing the function of the second embodiment.

FIGS. 9A and 9B show, among the functions of the second embodiment, the difference from the first embodiment (FIGS. 2 to 8), and FIG. 9A shows a part of the flow chart while FIG. 9B is a list of altered portions.

In FIG. 9A, a step S220 shows the YES branch of the step S18, and a step S222 registers the output bins corresponding to the lines in the registration circuit 30 through the signal line 30a, for example the first bin for the lines A and B, and the second for the lines C and D. Thereafter the sequence proceeds to the step S22 from a step S224.

Also, as shown in FIG. 9B, the steps S108, S120 are altered from the "second bin" to the "first bin", and the steps S124, S128, S130 are altered from the "communication number 2" to the "communication number 1".

Also the steps S148, S160 are altered from the "third bin" to the "second bin", and the steps S164, S168, S170 are altered from the "communication number 3" to the "communication number 2".

Further, the steps S188, S200 are altered from the "fourth bin" to the "second bin", and the steps S204, S208, S210 are altered from the "communication number 4" to the "communication number 2".

As explained in the foregoing, in case a facsimile apparatus connected to plural lines is used by plural organizations with each line assigned to each organization, the communication result report of each organization can be outputted in each output bin whereby the convenience of use can be extremely improved.

In the following there will be explained a third embodiment of the present invention.

In the conventional facsimile apparatus connected to plural lines, the recording control at the reception is not particularly changed according to the line used at the reception. For example, cassettes are provided for the recording sheets of A4, B4 and A3 sizes, the information of the A4-, B4- or A3-sized original is respectively recorded on the sheet of A4, B4 or A3 size regardless of the line used.

Therefore, in case a facsimile apparatus with two lines is purchased and used by two companies, it is extremely tedious to sort the facsimile receptions to the two companies and such sorting has to be made according to the content of each reception. Consequently, the third embodiment of the present invention provides a facsimile apparatus enabling easy sorting.

Figure 10:
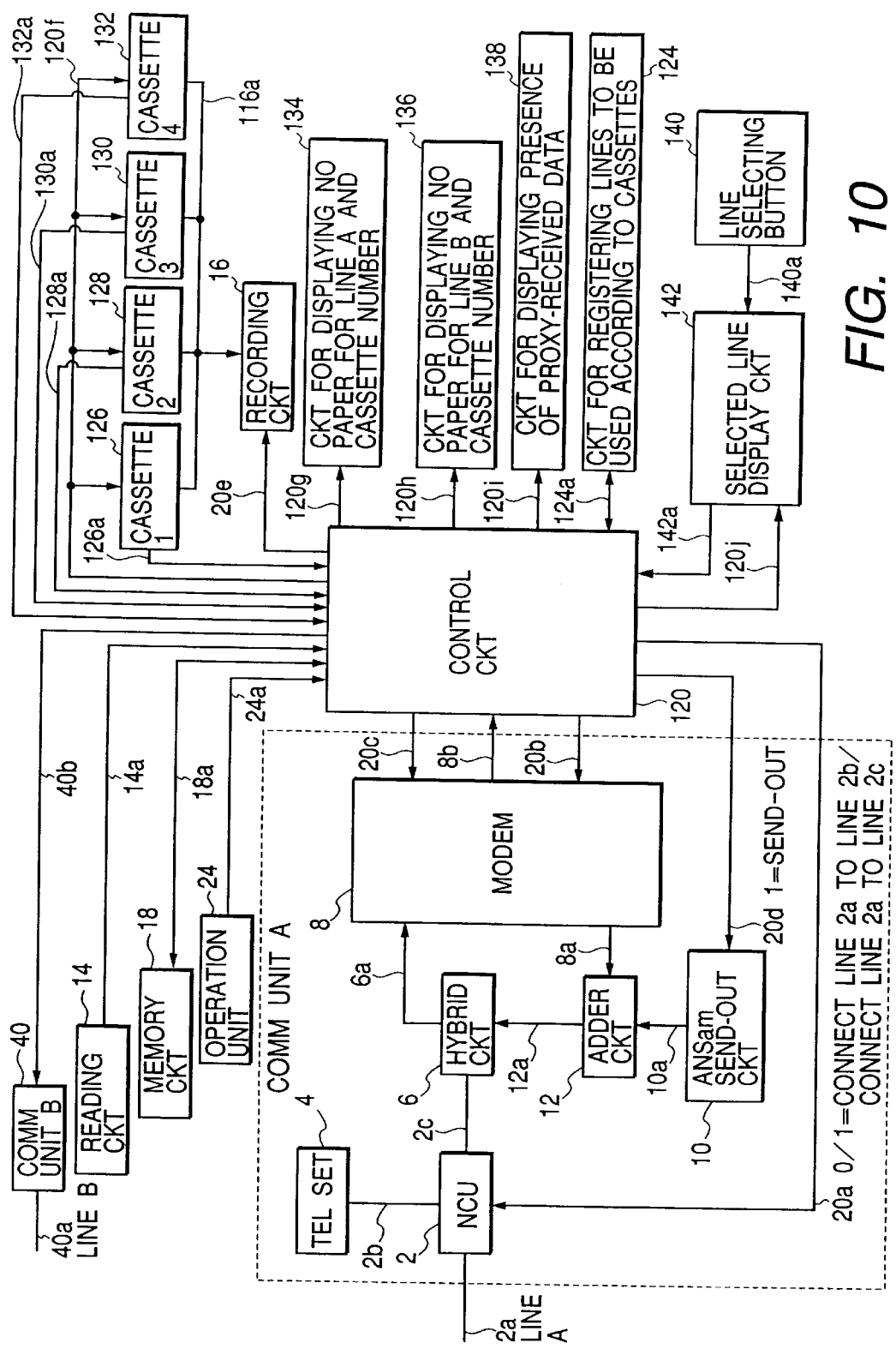
FIG. 10 is a block diagram showing a third embodiment of the present invention.

FIG. 10 is a block diagram showing the configuration of a facsimile apparatus constituting the third embodiment of the present invention, wherein blocks same as those in FIG. 1 are represented by same number and will not be explained further.

A registration circuit 124 serves to register, through a signal line 124a, the recording sheet to be used in cassettes (first, second, third or fourth cassette) corresponding to the line (A or B). As an example, it is assumed that the first and second cassettes are registered for the line A while the third and fourth cassettes are registered for the line B.

Among the first to fourth cassettes (cassettes 1 to 4) 126 to 132, the recording is made on the recording sheet contained in the first cassette 126 in case a signal "1" is outputted on a signal line 120f, and the recording is similarly made on the recording sheet contained in the second, third or fourth cassette 128 to 132 respectively in case a signal "2", "3" or "4" is outputted on the signal line 120f.

On a signal line 126a, there is outputted information indicating the size of the recording sheet contained in the first cassette 126 and the presence of the sheet therein. Similarly, on signal lines 128a, 130a, 132a there are outputted information indicating the sizes of the recording sheets contained in the second, third and fourth cassettes 128 to 132 and the presence of the sheets therein. A signal line 116a schematically indicates the paths of the recording sheets from the cassettes.

A display circuit 134 displays the absence of recording sheets in the cassette when the line A is used and the cassette having no sheet, by receiving the information of a signal line 120g.

A display circuit 136 displays the absence of recording sheets in the cassette when the line B is used and the cassette having no sheet, by receiving the information of a signal line 120h.

A display circuit 138 displays that proxy reception is executed because of absence of the recording sheet in the cassette corresponding to the used line, and executes such displays or not according as the signal level on a signal line 120i is "1" or "0".

A selection button 140 selects the line A or B for a call, and a depression pulse is generated on a signal line 140a when the selection button 140 is depressed.

A display circuit 142 is used for displaying when the line A or B is to be used in telephone calling. It displays "line A used" when a clear pulse is generated on a signal line 120j, and displays "line B used", "line A used", or "line B used" in succession upon every generation of a depression pulse on the signal line 140a. Also it outputs a signal "0" on a signal line 142a when "line A used" is displayed, and similarly outputs a signal "1" on the signal line 142a respectively when "line B used" is displayed.

The control circuit 120 in the facsimile apparatus with plural lines (lines A and B) constituting the third embodiment of the present invention is adapted to set the cassette to be used at reception for each line, and, in the receiving operation, to effect recording on the recording sheet selected according to the line.

For each line there can be set plural cassettes. In case the cassette to be used corresponding to the line contains no sheet, there is executed memory reception regardless whether the cassette to be used corresponding to another line contains sheet or not. On the other hand, there is memorized the line selected at the call making, and the communication result report for the transmission is recorded on the recording sheet, by checking the used line and based on the information setting the cassette to use for reception for each line.

FIGS. 11 to 19 are flow charts showing the control sequence of the control circuit 120 in the third embodiment of the present invention.

Figure 11:
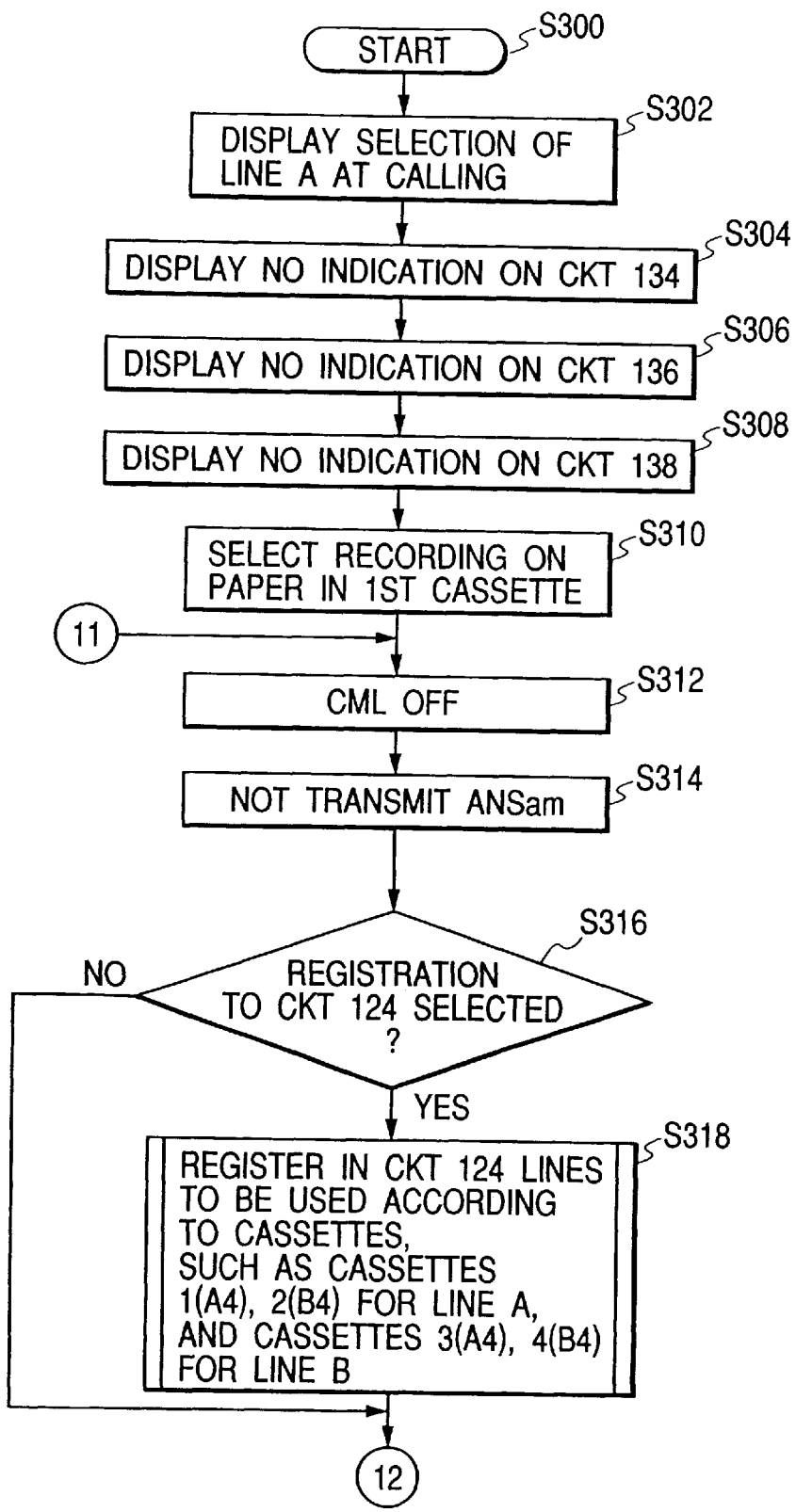
FIGS. 11, 12, 13, 14, 15, 16, 17, 18 and 19 are flow charts showing the function of the third embodiment.
Figure 12:
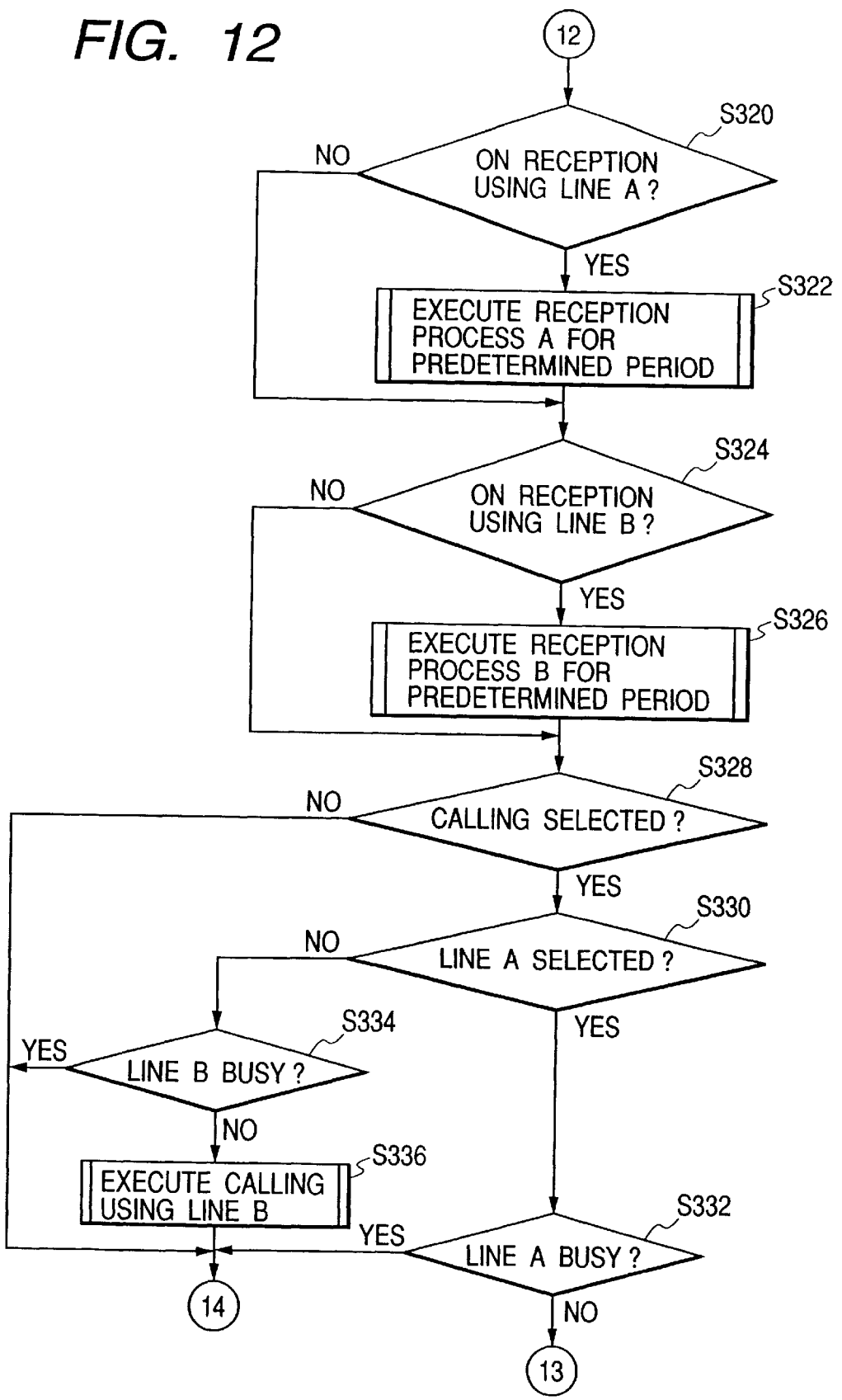
Figure 13:
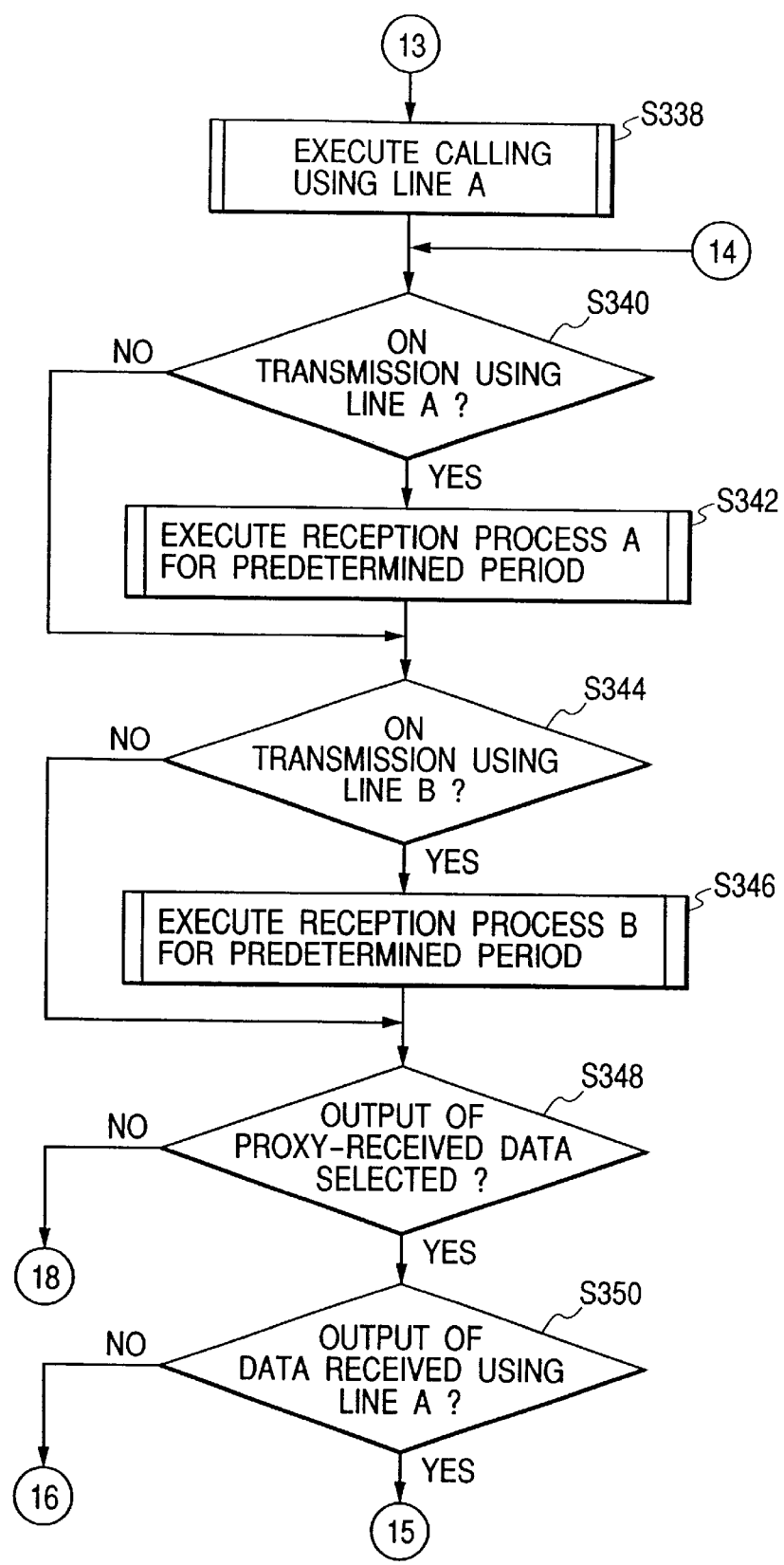
Figure 14:
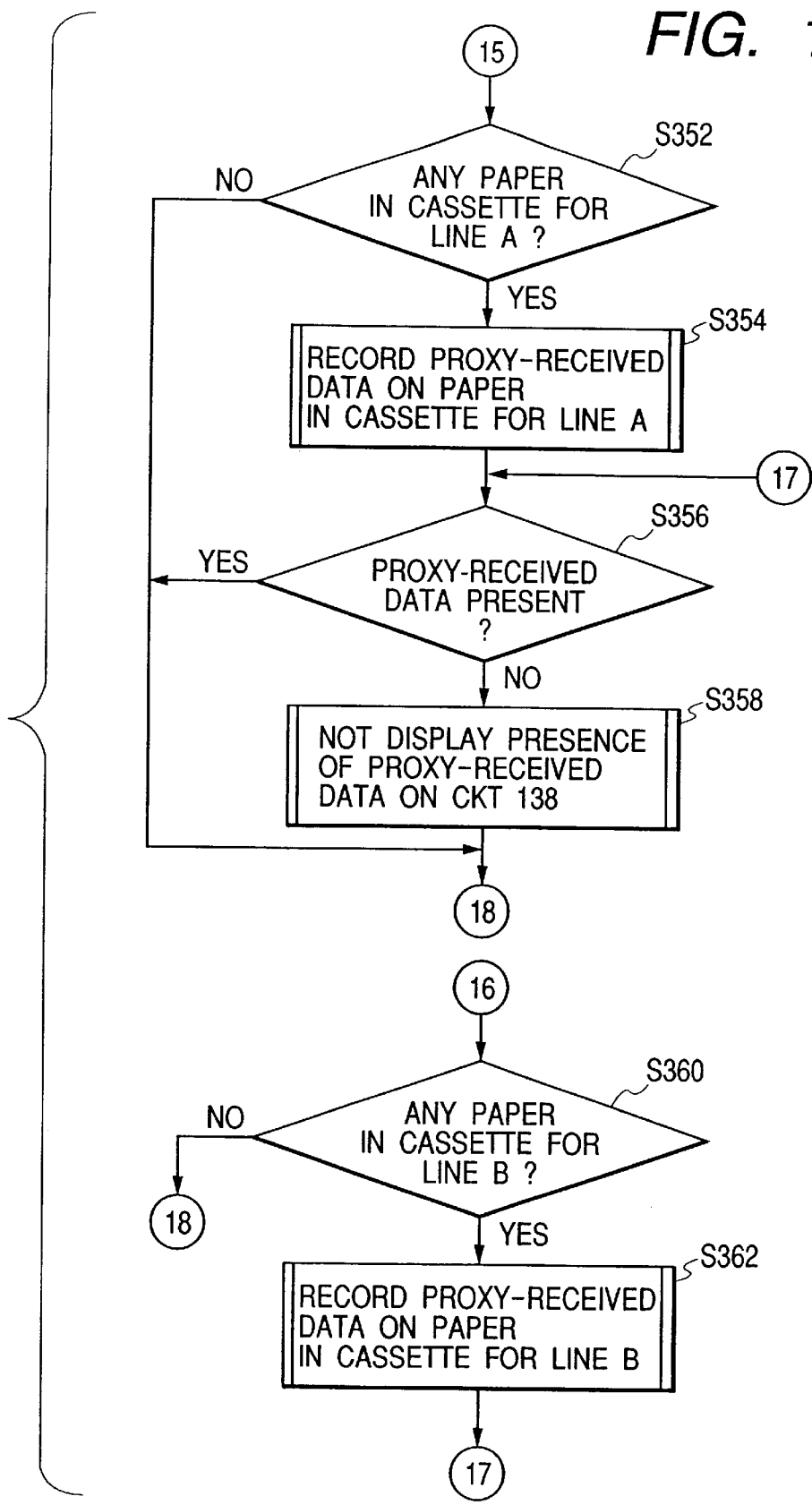
Figure 15:
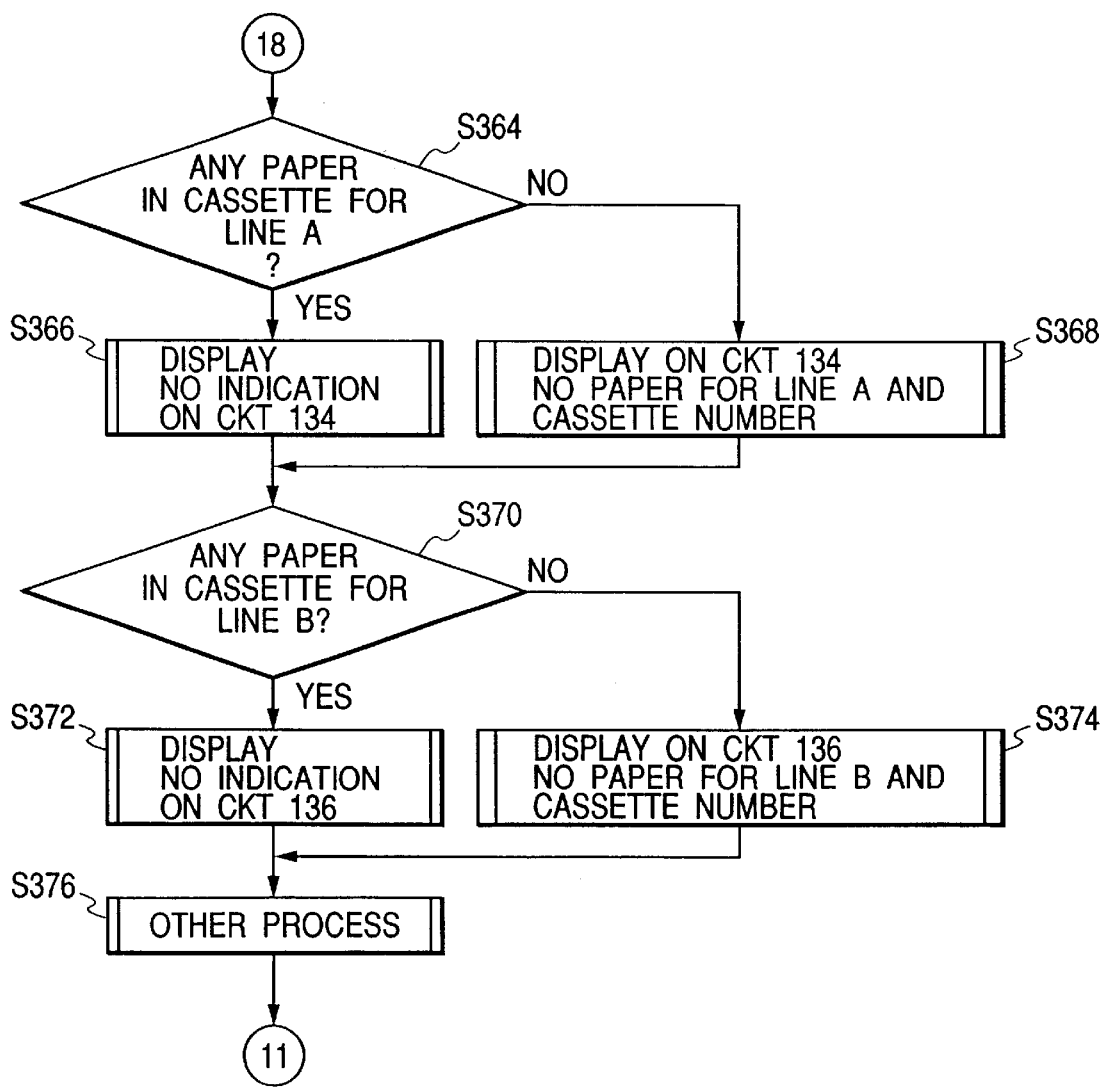
Figure 16:
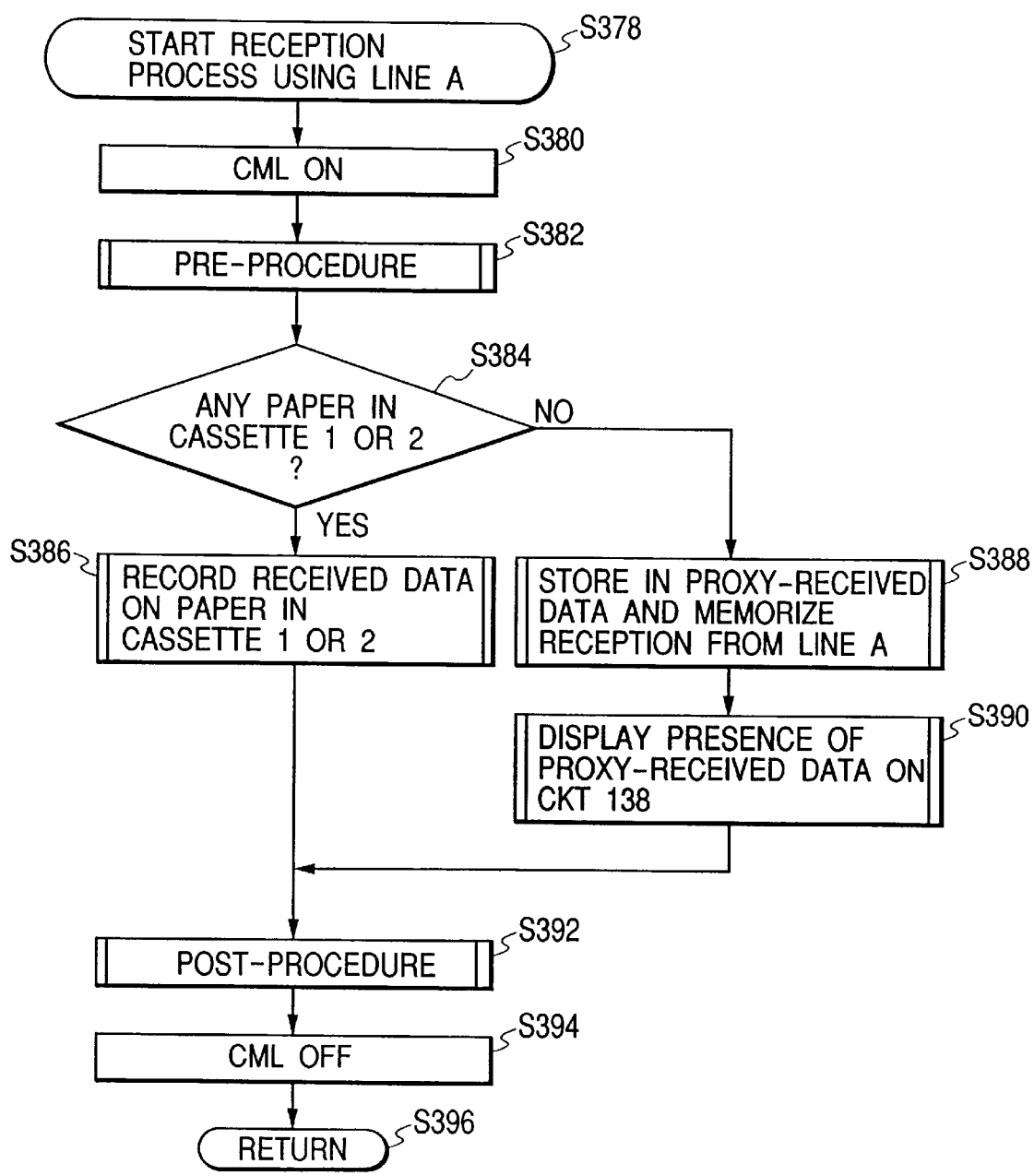
Figure 17:
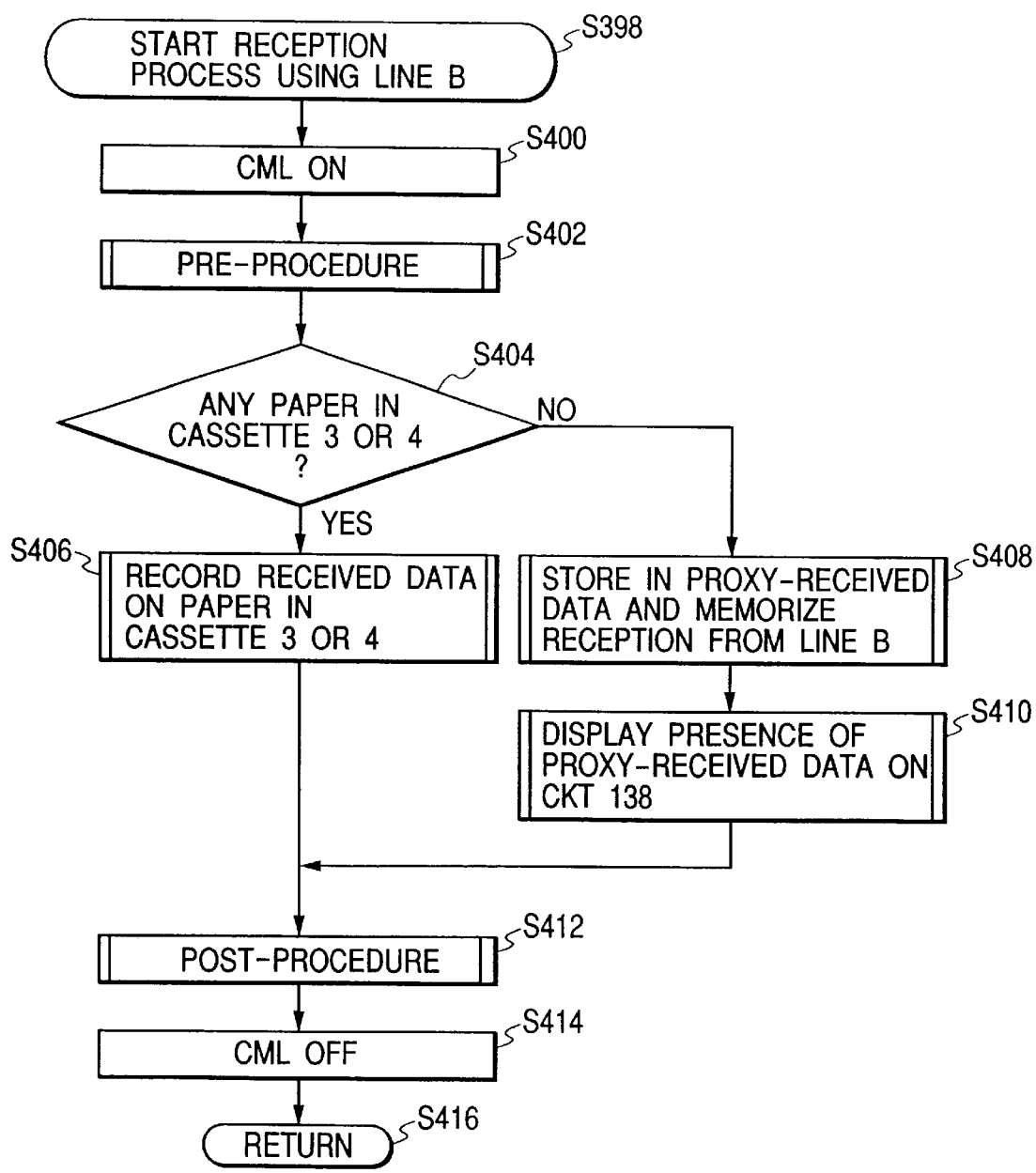
Figure 18:
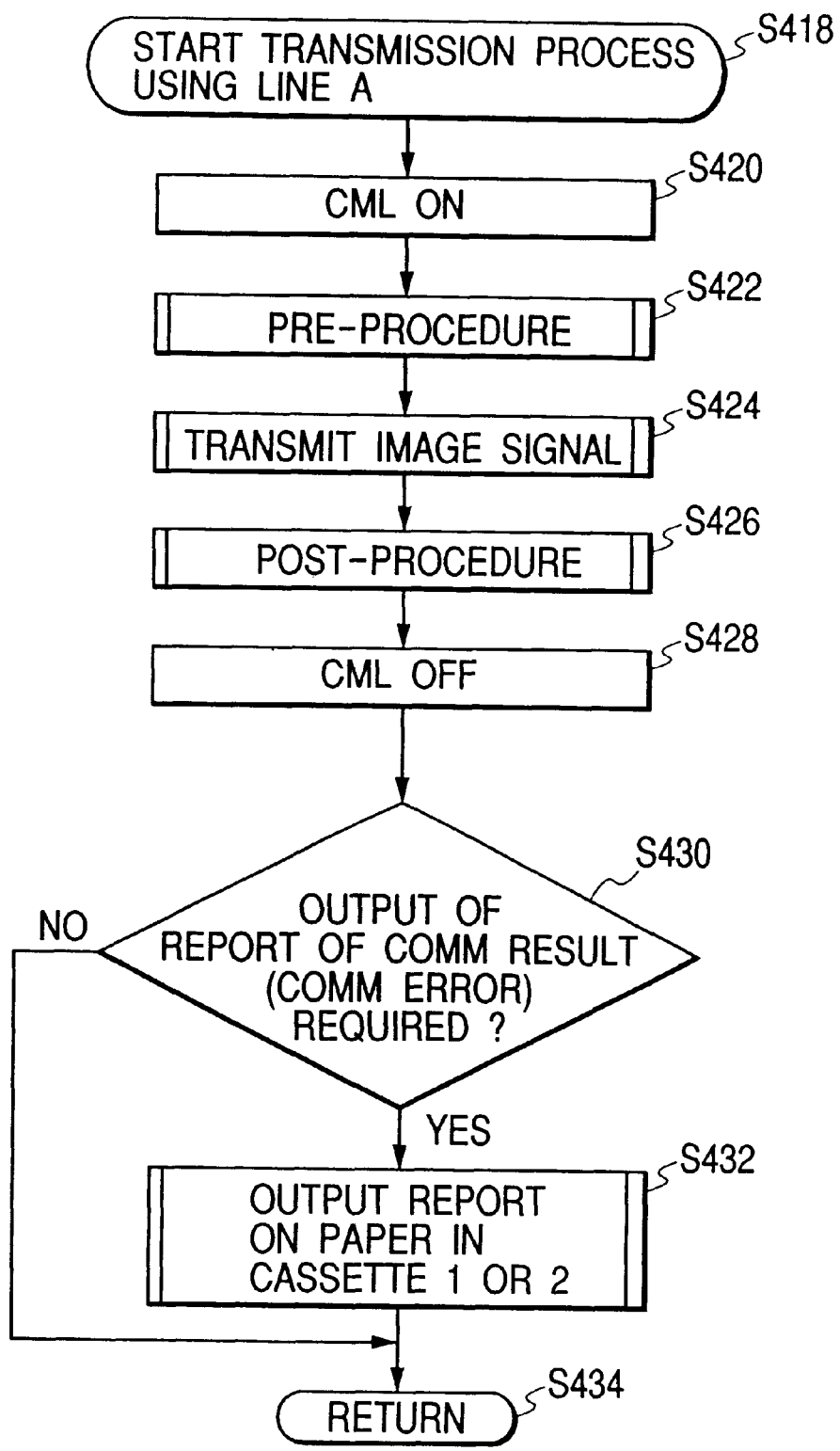
Figure 19:
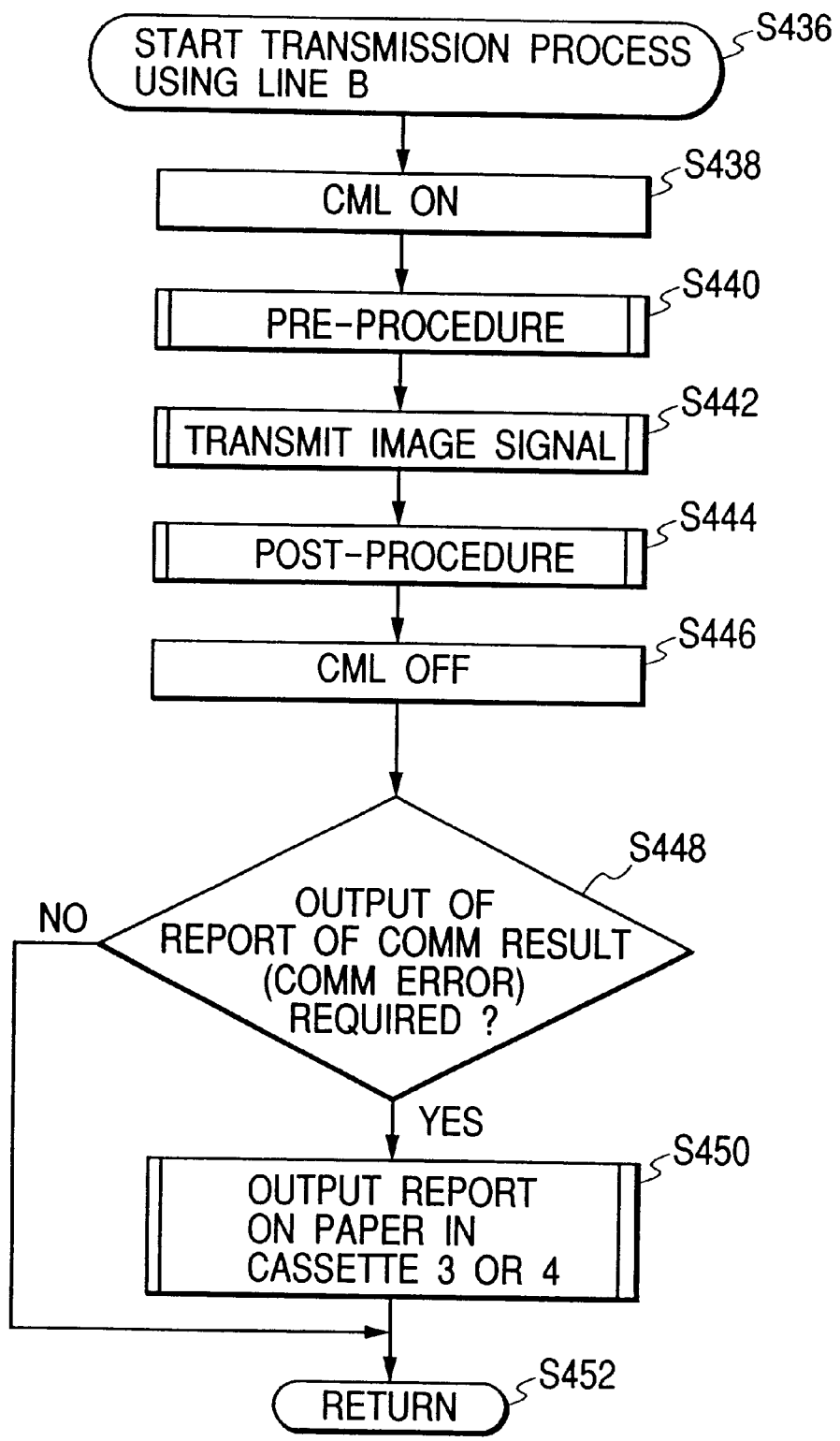

Referring to FIG. 11, a step S300 starts the sequence, and a step S302 generates a clear pulse on the signal line 120*j* for displaying the selection of the line A at the call making. A step S304 sets, through the signal line 120*g*, the display circuit 134 in a state of no display. A step S306 sets, through the signal line 120*h*, the display circuit 136 in a state of no display.

A step S310 outputs a signal "1" on the signal line 120*f*, thereby designating the recording on the recording sheet of the first cassette. A step S312 outputs a signal "0" on the signal line 120*a* to turn off the CML. A step S314 outputs a signal "0" to the signal line 120*d* in order not to output the ANSam signal.

A step S316 enters the information of the signal line 24*a* and discriminates whether the registration in the registration circuit 124 is selected, and the sequence proceeds to a step S318 or S320 according as the registration is selected or not.

The step S318 registers, in the registration circuit 124 through the signal line 124*a*, the line to be used corresponding to the cassette. For example, the registration is so made as to use the first cassette (for example containing A4-sized sheet) for the line A, the second cassette (for example containing B4-sized sheet) for the line A, the third cassette (for example containing A4-sized sheet) for the line B and the fourth cassette (for example containing B4-sized sheet) for the line B.

The step S320 discriminates whether a reception operation utilizing the line A is in progress, and, if so, the sequence proceeds to a step S322 to execute a reception process A of a step S378 for a predetermined time (in case the step S322 is executed next time, it is started from a process executed immediately before. This applies also to steps S326, S342 and S346). Then the sequence returns to the main flow and proceeds to a step S324. Also if the reception operation is not in progress, the sequence directly proceeds to the step S324.

The step S324 discriminates whether a reception operation utilizing the line B is in progress, and, if so, the sequence proceeds to the step S326 to execute a reception process B of a step S398 for a predetermined time. Then the sequence returns to the main flow and proceeds to a step S328. Also if the reception operation is not in progress, the sequence directly proceeds to the step S328.

The step S328 enters the information on the signal line 24*a* and discriminates whether a call making is selected, and the sequence proceeds to a step S330 or S340 according as the call making is selected or not.

The step S330 enters the information of the signal line 142*a* and discriminates whether a call making utilizing the line A is selected, and, according as it is selected or not, the sequence respectively proceeds to a step S332 or S334.

The step S332 discriminates whether the line A is currently in use, and, if in use, the sequence proceeds to the step S340, but, if not in use, the sequence proceeds to a step S338 for issuing a call utilizing the line A.

The step S334 discriminates whether the line B is currently in use, and, if in use, the sequence proceeds to the step S340, but, if not in use, the sequence proceeds to a step S336 for issuing a call utilizing the line B.

The step S340 discriminates whether a transmission operation utilizing the line A is in progress, and, if so, the sequence proceeds to the step S342 for executing a transmission operation A of a step S418 for a predetermined time. Then the sequence returns to the main flow and proceeds to a step S344. If the transmission operation is not in progress, the sequence directly proceeds to the step S344.

The step S344 discriminates whether a transmission operation utilizing the line B is currently in progress, and, if so, the sequence proceeds to the step S346 for executing a transmission operation B of a step S436 for a predetermined time and the sequence then returns to the main flow, but, if the transmission operation is not in progress, the sequence proceeds to a step S348.

A step S348 enters the information of the signal line 24*a* to discriminate whether the output by proxy reception is selected, and, if selected or not, the sequence respectively proceeds to a step S350 or S364.

The step S350 discriminates whether the output is from proxy received information utilizing the line A, and the sequence proceeds to a step S352 or S360 according as the result of discrimination is affirmative or negative.

The step S352 enters the information of the signal line 124*a* and discriminates whether the cassette corresponding to the line A (for example the first or second cassette) contains the recording sheet, and the sequence proceeds to a step S354 or the S364 according as the recording sheet is present or absent.

The step S354 records the information of the memory reception on the recording sheet of a cassette corresponding to the line A. For example the received information of A4 size is recorded on the recording sheet of the first cassette and that of B4 size is recorded on the recording sheet of the second cassette.

A step S356 discriminates whether the unoutputted information of the proxy reception is present in the memory, and, if present, the sequence proceeds to the step S364, but, if absent, the sequence proceeds to a step S358 for outputting a signal "0" to the signal line 120*i* thereby not displaying the presence of the proxy reception on the display circuit 138.

The step S360 enters the information of the signal line 124*a* and discriminates whether the cassette corresponding to the line B (for example the third or fourth cassette) contains the recording sheet, and the sequence proceeds to a step S362 or the S364 according as the recording sheet is present or absent.

The step S362 records the information of the memory reception on the recording sheet of a cassette corresponding to the line B. For example the received information of A4 size is recorded on the recording sheet of the third cassette and that of B4 size is recorded on the recording sheet of the fourth cassette.

The step S364 enters the information of the signal lines 124*a*, 126*a* and 128*a* and discriminates whether the cassette corresponding to the line A (for example the first or second cassette). If the recording sheet is present, the sequence proceeds to a step S366 for disabling the display circuit 134 through the signal line 120*g* and then to a step S370. If the recording sheet is absent, the sequence proceeds to a step S368 for causing, through the signal line 120*g*, the display circuit 134 to display that the recording sheet to be used for the line A is absent and the cassette in which the recording sheet is absent, and then proceeds to the step S370.

The step S370 enters the information of the signal lines 124*a*, 130*a* and 132*a* and discriminates whether the cassette corresponding to the line B (for example the third or fourth cassette). If the recording sheet is present, the sequence proceeds to a step S372 for disabling the display circuit 134 through the signal line 120*g* and then to a step S376. If the recording sheet is absent, the sequence proceeds to a step S374 for causing, through the signal line 120*h*, the display circuit 136 to display that the recording sheet to be used for the line B is absent and the cassette in which the recording sheet is absent, and then proceeds to a step S376.

The step S376 executes other processes and the sequence proceeds to the step S312.

The step S378 starts a reception process utilizing the line A. Then a step S380 outputs a signal "1" to the signal line 20a to turn on the CML. A step S382 executes a pre-process, then a step S384 discriminates whether the recording sheet is present in the first or second cassette, and the sequence proceeds to a step S386 or S388 according as the recording sheet is present or absent.

The step S386 records the received information on the recording sheet in the first or second cassette. According as the original is of A4 or B4 size, the recording is made on the recording sheet of the first or second cassette.

The step S388 stores the received information in the memory. There is also stored information indicating the reception from the line A. Then a step S390 outputs a signal "1" to the signal line 120i for displaying the presence of the proxy reception on the display circuit 138.

Then a step S392 executes a post-process, and a step S394 outputs a signal "0" to the signal line 20a for turning off the CML. Then the sequence returns to the main flow from a step S396.

The step S398 starts a reception process utilizing the line B. In the following there will be explained, in a sequence from a step S400 to S416, portions different from the sequence from the step S380 to S396.

The step S400 and a step S414 deal with the CML of the communication unit B. Also a step S404 discriminates whether the recording sheet is present in the third or fourth cassette, and the sequence proceeds to a step S406 or S408 according as the recording sheet is present or absent.

A step S406 records the received information on the recording sheet of the third or fourth cassette. According as the original is of A4 or B4 size, the recording is made on the recording sheet of the third or fourth cassette.

A step S408 stores the received information in the memory. There is also stored information indicating the reception from the line B.

A step S418 starts a transmission process utilizing the line A. Then a step S420 outputs a signal "1" to the signal line 20a to turn on the CML of the communication unit A. A step S422 executes a post-procedure, then a step S424 executes transmission of the image signal, and a step S426 executes a post-procedure.

A step S428 outputs a signal "0" on the signal line 20a to turn on the CML of the communication unit A. A step S430 discriminates whether a communication result report is required because of a communication error, and, if required, the sequence proceeds to a step S432, but, if not, the sequence proceeds to the step S434.

The step S432 outputs the communication result report on the recording sheet of the first or second cassette. The output is made on the recording sheet of the first cassette, if the recording sheet is contained therein.

The step S436 starts a transmission process utilizing the line B. In the following there will be explained, in a sequence from a step S438 to S452, portions different from the sequence from the step S420 to S434.

At first a step S450 outputs the communication result report on the recording sheet of the third or fourth cassette. The output is made on the recording sheet of the third cassette, if the recording sheet is contained therein. Also the step S438 and a step S446 deal with the CML of the communication unit B.

The above-explained configuration extremely facilitates the sorting of the received information to the respective organizations, thereby improving the convenience of use, for example for two lines, by using the cassette 1 (containing white A4-sized recording sheet) and the cassettes 2 (containing white B4-sized recording sheet) for the line A, while using the cassette 4 (containing blue A4-sized recording sheet) and the cassette 4 (containing blue B4-sized recording sheet) for the line B, and using the telephone number of the line A for an organization a and that of the line B for the other organization b.

Also according to the foregoing embodiments, in case of absence of the recording sheet in the facsimile apparatus with two lines utilized by two organizations respectively with white and blue recording sheets, the information for the organization a or b can be securely recorded on the sheet of the respectively designated color, whereby the sorting between the two organizations can be made extremely easy.

Also according to the foregoing embodiments, in case of absence of the recording sheet in the facsimile apparatus with two lines utilized by two organizations respectively with white and blue recording sheets, the transmission result report can be recorded on the white or blue recording sheet respectively for the organization a or b, whereby the sorting of such report becomes extremely easy.

In the following there will be explained a fourth embodiment of the present invention.

The fourth embodiment provides a facsimile apparatus capable of facilitating the sorting in case the lines A and B are used by different companies, by adopting different colors in the recording sheet set in the cassette to be used for reception from the line A and in the recording sheet set in the cassette to be used for reception from the line B. Thereby, the sorting becomes extremely easy when the lines A and B are used by different companies.

Figure 20:
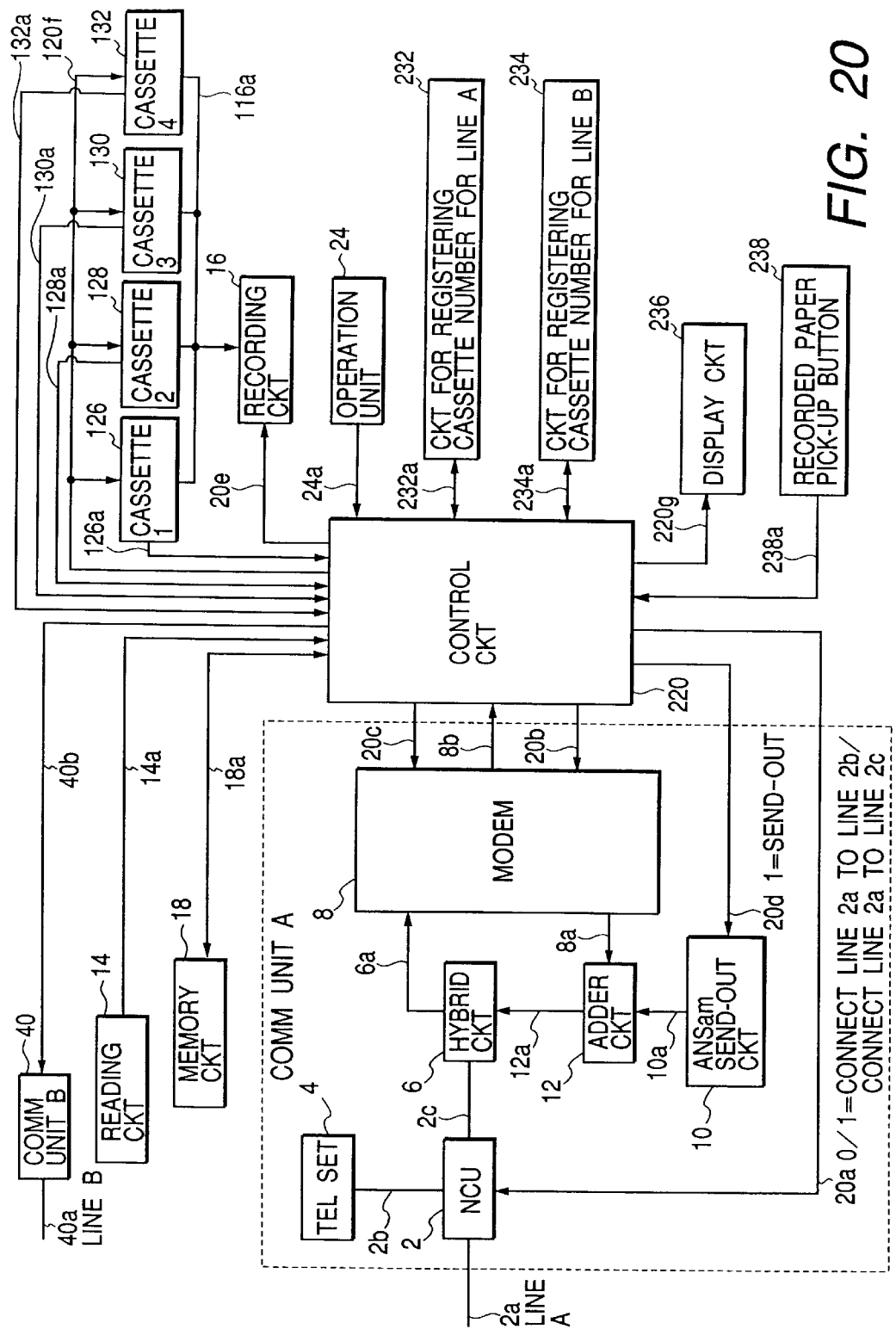
FIG. 20 is a block diagram showing a fourth embodiment of the present invention.

FIG. 20 is a block diagram showing the configuration of a facsimile apparatus constituting the fourth embodiment of the present invention. In FIG. 20, blocks same as those in FIGS. 1 and 10 are represented by same numbers and will not be explained further.

A registration circuit 232 registers a cassette corresponding to the line A. For example, the first and second cassettes are registered, through a signal line 232a, for use in the reception through the line A.

A registration circuit 234 registers a cassette corresponding to the line B. For example, the third and fourth cassettes are registered, through a signal line 234a, for use in the reception through the line B.

A registration circuit 236 enters the information of a signal line 220g and displays, for example, "communications of a number (**) received through the line A have been recorded on the recording sheet to be used for the line B".

A button 238 is to be depressed in case the recording sheet tray contains no recording sheet because the recording sheet other than the designation of the line is picked up, and a depression pulse is generated on a signal line 238a by the depression of the button 238.

A control circuit 220 in a facsimile apparatus with two lines serves to register the cassette to be used in the reception utilizing the line A and that to be used in the reception utilizing the line B, and to execute the memory reception in case of absence of the recording sheet in the cassette to be used in the reception utilizing the line A.

Also in such memory reception, if the memory capacity becomes deficient and if the cassette to be used for the reception utilizing the line B contains the recording sheet, all the information obtained by the memory reception utilizing the line A is recorded on such recording sheet, and a message that the information has been received through the line A is recorded on the first sheet in each communication. Also there are displayed such message and the number of communications recorded after the memory capacity becomes deficient. The relationship of the lines A and B may be inverted.

FIGS. 21 to 27 are flow charts showing the control sequence of the control circuit 220 in the fourth embodiment of the present invention.

Figure 21:
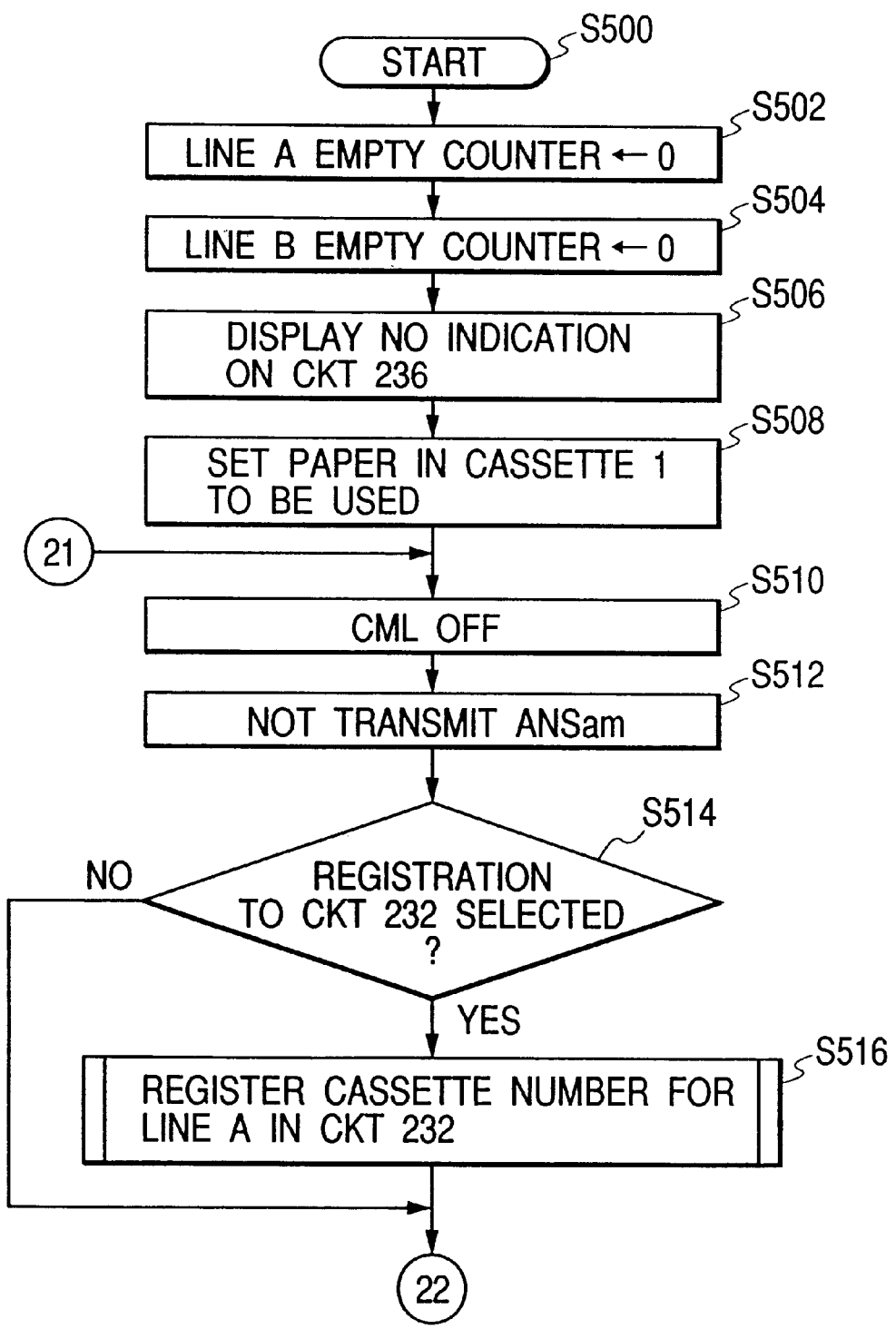
FIGS. 21, 22, 23, 24, 25, 26 and 27 are flow charts showing the function of the fourth embodiment.
Figure 22:
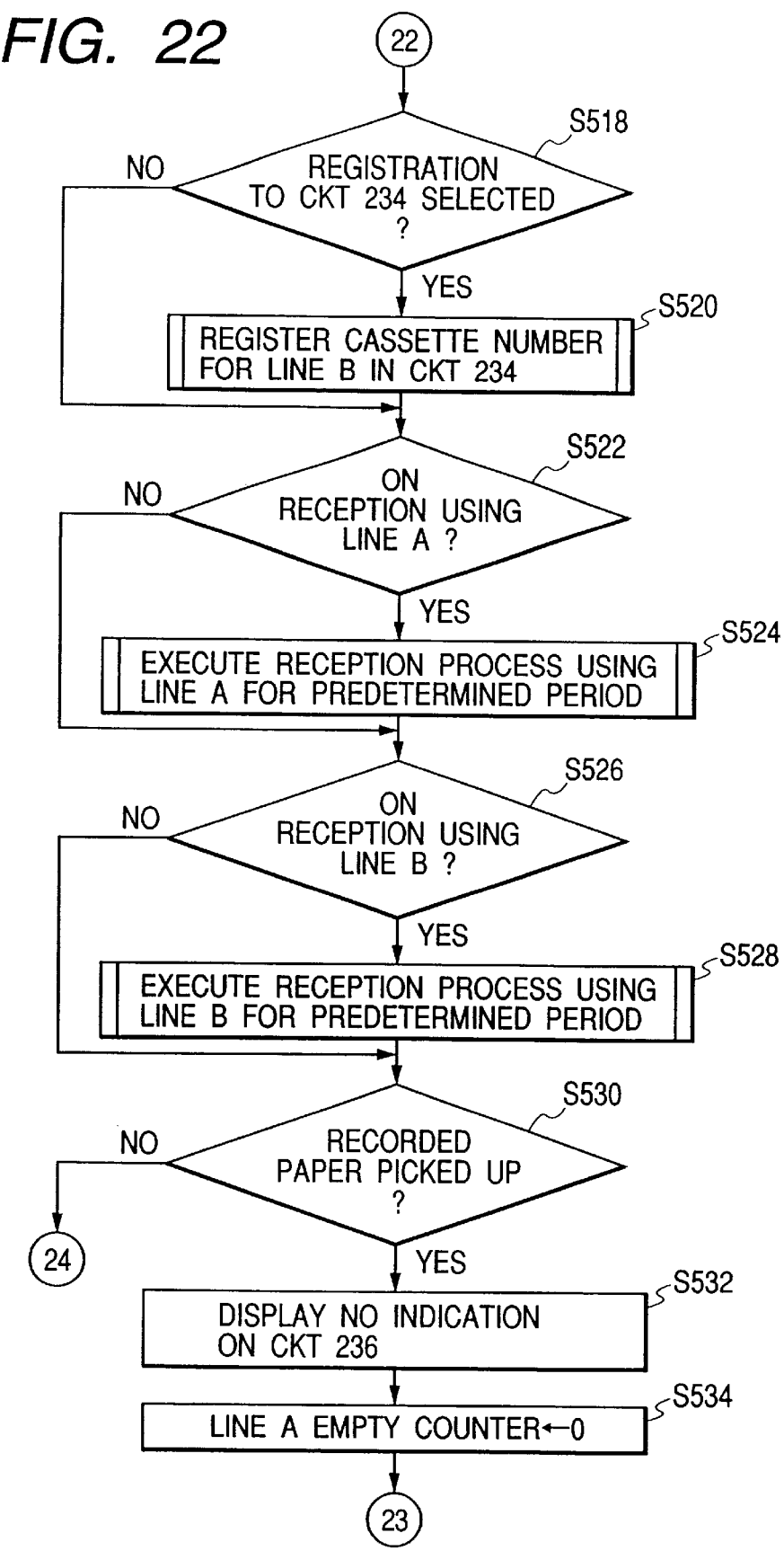
Figure 23:
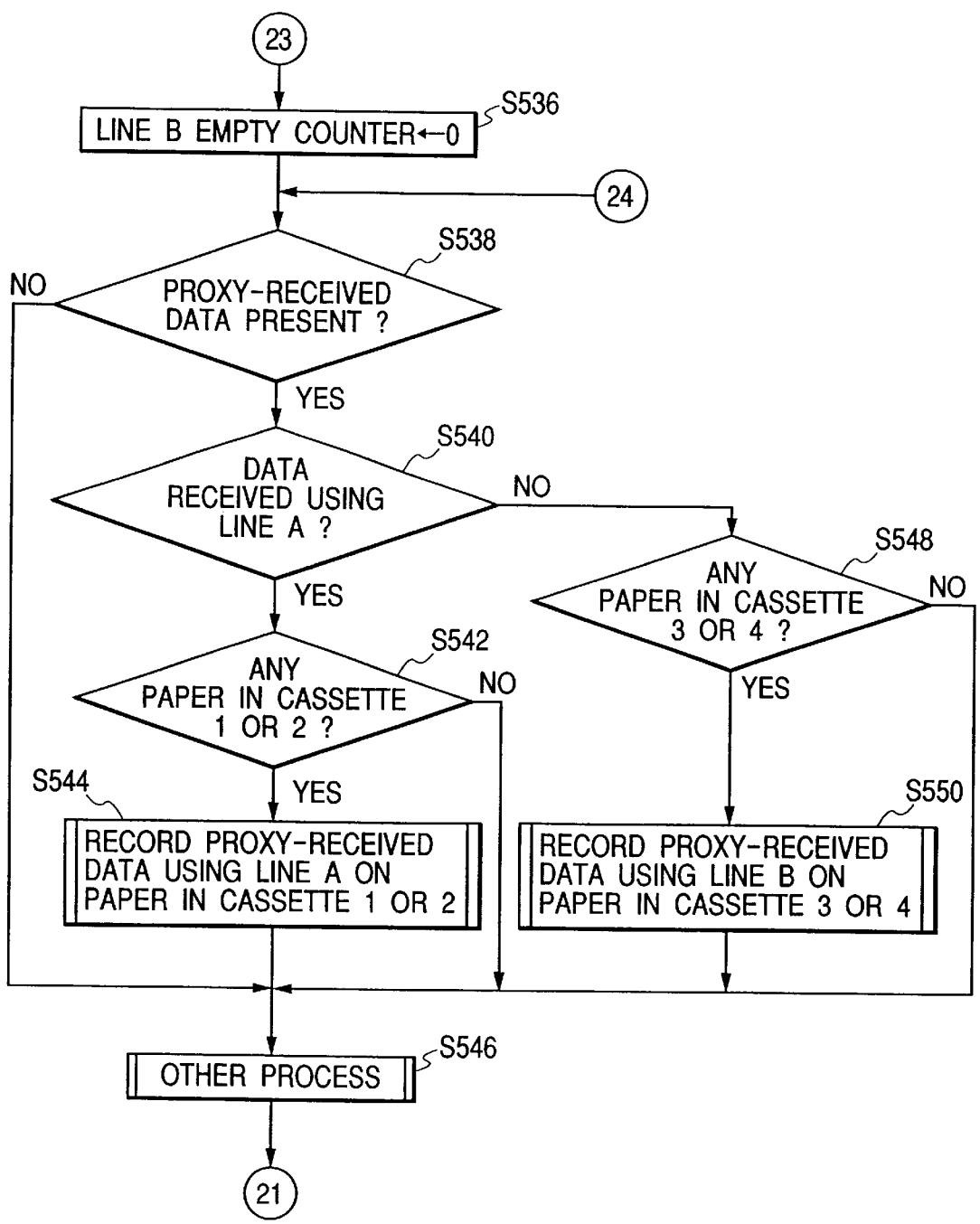
Figure 24:
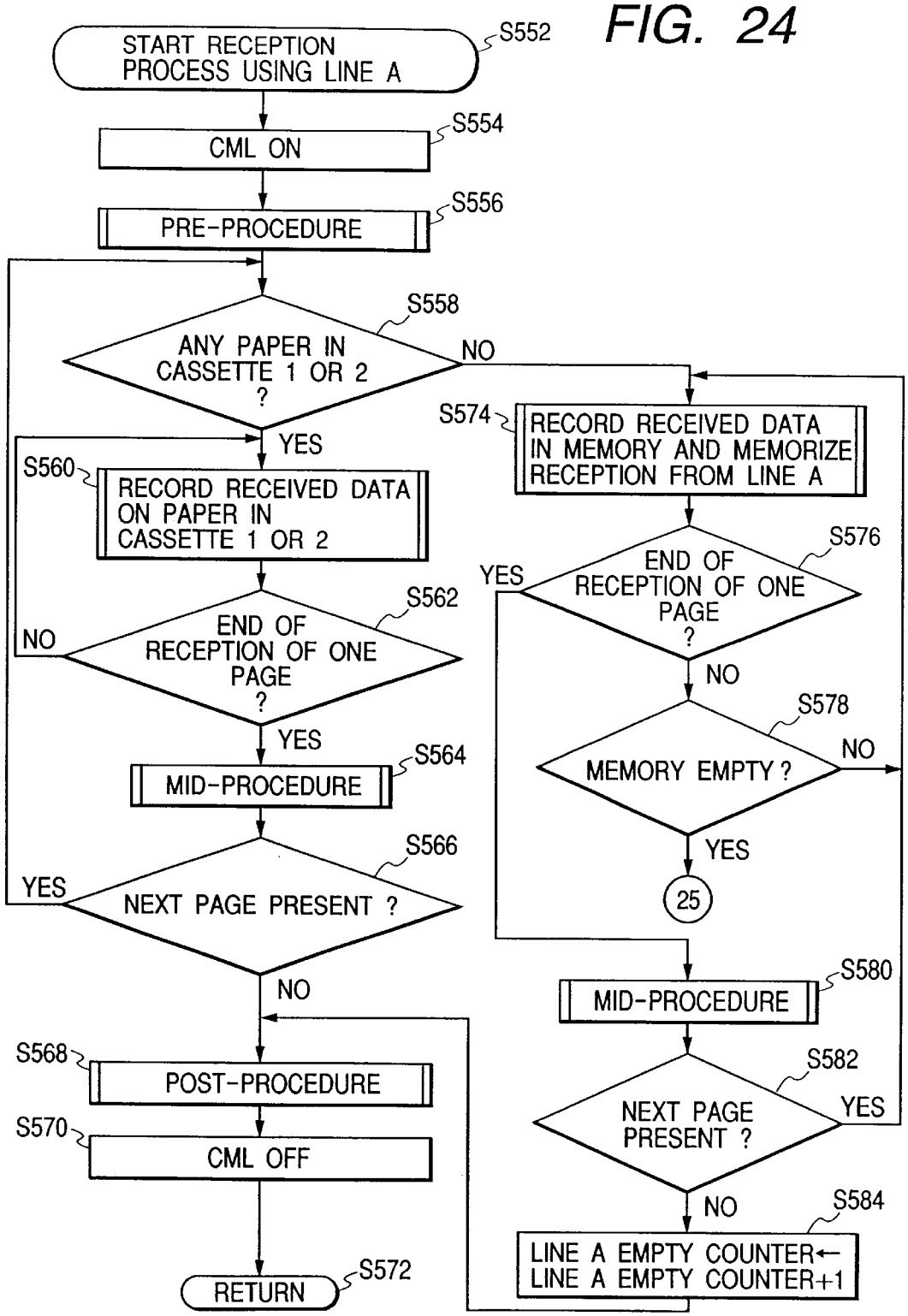
Figure 25:
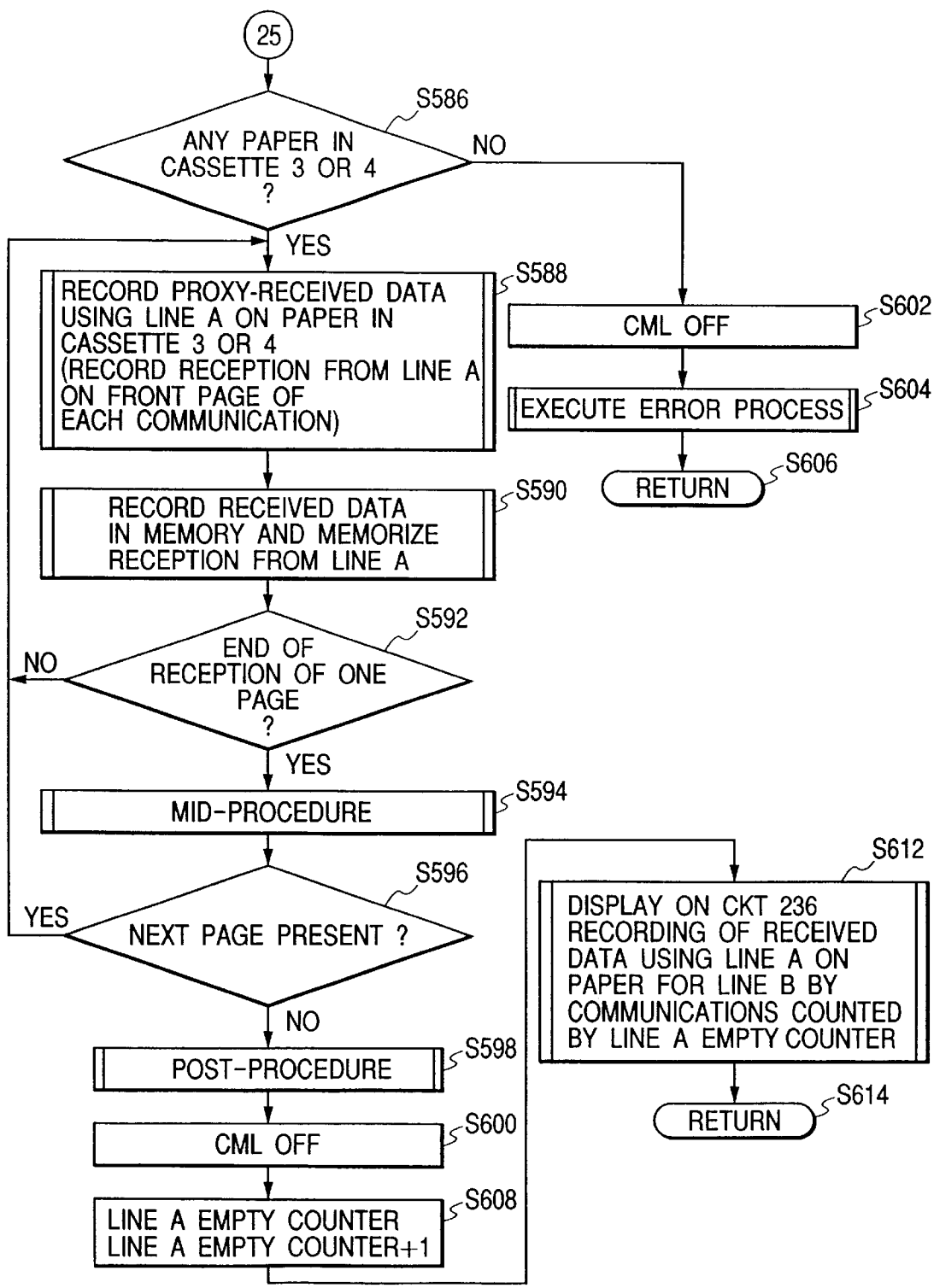
Figure 26:
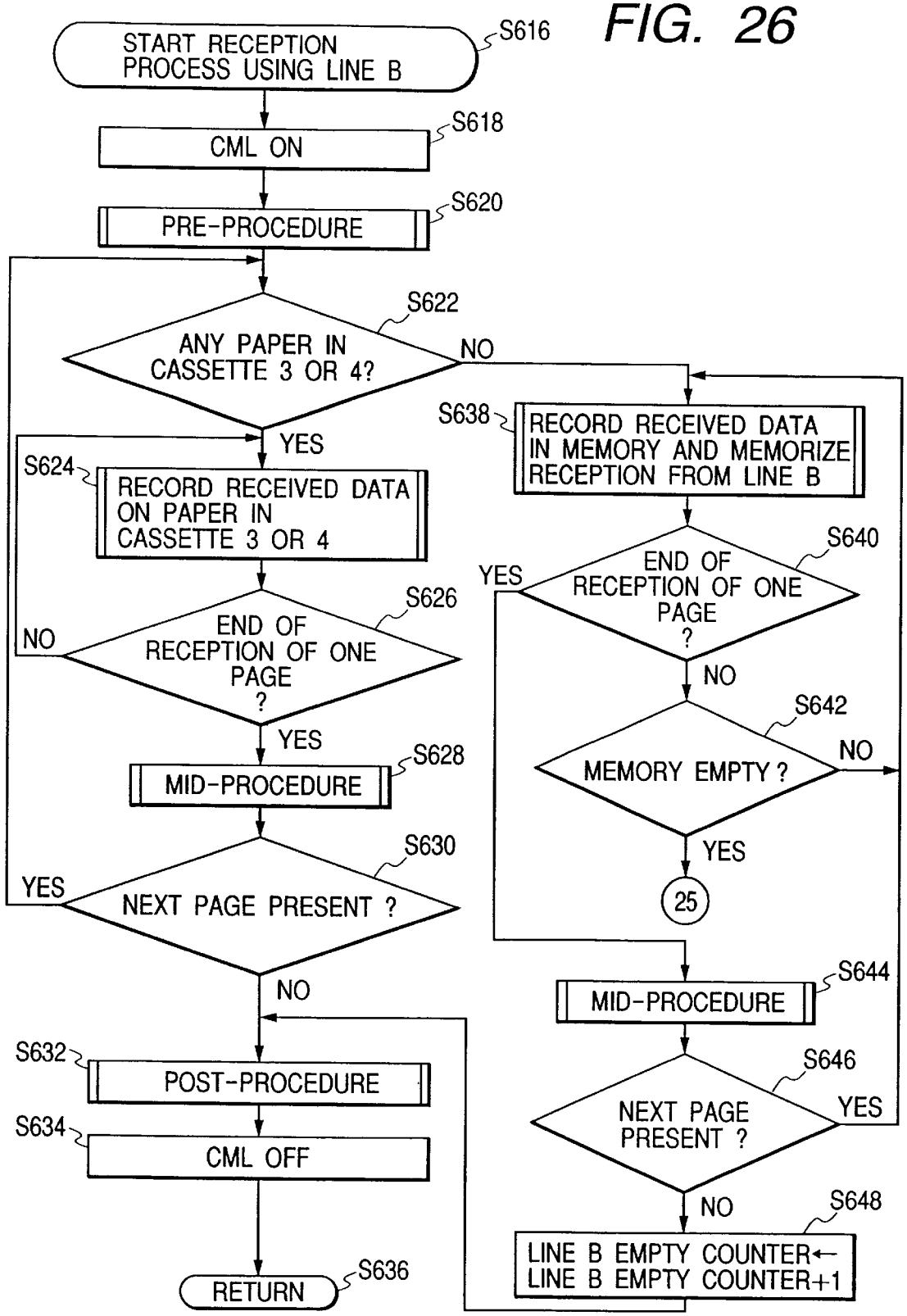
Figure 27:
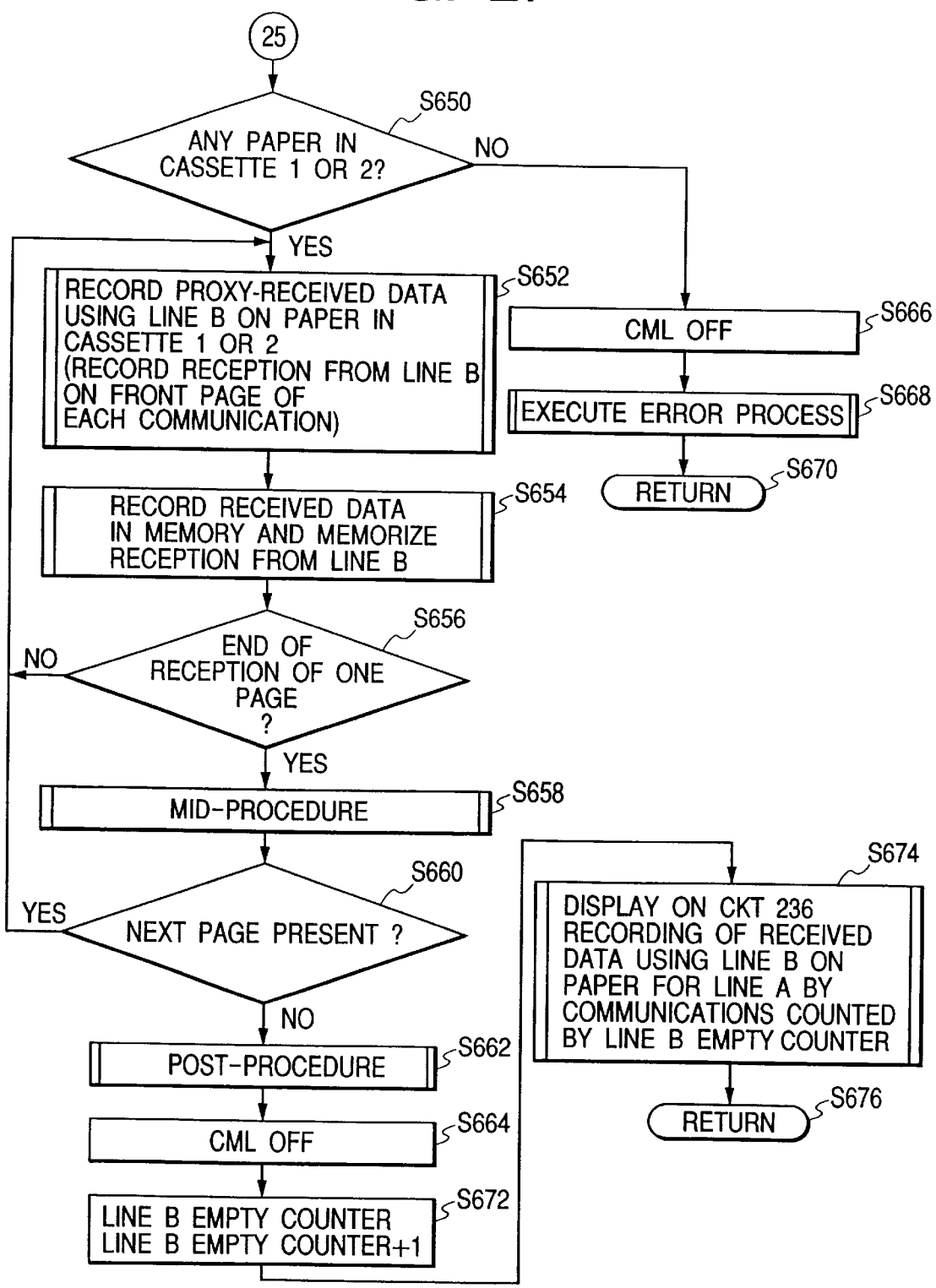

Referring to FIG. 21, a step S500 starts the sequence, and a step S502 resets, to 0, a counter (line A empty counter) for counting the number of communications recorded on the recording sheet of the cassette to be used in the reception utilizing the line B, in case the memory reception is executed because of no recording sheet in the cassette to be used in the reception utilizing the line A and the memory capacity thereafter becomes deficient.

A step S504 resets, to 0, a counter (line B empty counter) for counting the number of communications recorded on the recording sheet of the cassette to be used in the reception utilizing the line A, in case the memory reception is executed because of no recording sheet in the cassette to be used in the reception utilizing the line B and the memory capacity thereafter becomes deficient.

A step S506 shifts, through a signal line 220g, the display circuit 236 to a state of no display. A step S508 outputs a signal "1" to the signal line 120f for using the recording sheet of the first cassette.

A step S510 outputs a signal "0" to the signal line 20a, thereby turning off the CML. A step S512 outputs a signal "0" to the signal line 20d so as not to transmit the ANSam signal.

A step S514 enters the information of the signal line 24a to discriminate whether the registration in the registration circuit 232 is selected, and, if selected, the sequence proceeds to a step S516 for registering, for example, the first and second cassettes corresponding to the line A in the registration circuit 232 through the signal line 232a, and proceeds then to a step S518. If the registration is not selected, the sequence proceeds directly to the step S518.

The step S518 enters the information of the signal line 24a to discriminate whether the registration in the registration circuit 234 is selected, and, if selected, the sequence proceeds to a step S520 for registering, for example, the third and fourth cassettes corresponding to the line B in the registration circuit 234 through the signal line 234a, and proceeds then to a step S522. If the registration is not selected, the sequence proceeds directly to the step S522.

The step S522 discriminates whether a reception operation by the line A is in progress, and, if in progress, the sequence proceeds to a step S524 for executing the reception process for a predetermined time utilizing the line A, and the sequence then proceeds to a step S526. If the reception operation is not in progress, the sequence proceeds directly to the step S526.

The step S526 discriminates whether a reception operation by the line B is in progress, and, if in progress, the sequence proceeds to a step S528 for executing the reception process for a predetermined time utilizing the line B, and the sequence then proceeds to a step S530. If the reception operation is not in progress, the sequence proceeds directly to the step S530.

The step S530 enters the information of the signal line 238a to discriminate whether the reception sheet has been picked up, and the sequence proceeds to a step S532 or S538 according as the reception sheet has been picked up or not.

The step S532 disables the display circuit 236 through the signal line 220g. A step S534 clears the line A empty counter, as the reception sheet has been picked up. A step S536 clears the line B empty counter, as the reception sheet has been picked up.

The step S538 discriminates whether information obtained by memory proxy reception is present in the memory, and the sequence proceeds to a step S540 or S546 respectively if the information is present or absent. The step S540 discriminates whether the information obtained by the memory proxy reception is obtained by the reception utilizing the line A, and the sequence proceeds to a step S542 if the result is affirmative but the sequence proceeds to a step S548 if the result is negative, namely if the information is obtained by the reception utilizing the line B.

The step S542 enters the information of the signal lines 126a, 128a to discriminate whether the recording sheet is present in the first or second cassette, and, if the result is affirmative, the sequence proceeds to a step S544 for outputting the information obtained by the memory proxy reception utilizing the line A by the recording sheet in the first or second cassette, but, if the result is negative, the sequence proceeds to the step S546. The step S546 executes other processes and the sequence proceeds to the step S510.

The step S548 enters the information of the signal lines 130a, 132a to discriminate whether the recording sheet is present in the third or fourth cassette, and, if the result is affirmative, the sequence proceeds to a step S550 for outputting the information obtained by the memory proxy reception utilizing the line B by the recording sheet in the third or fourth cassette and then proceeds to the step S546. On the other hand, if the result is negative, the sequence proceeds directly to the step S546.

A step S552 starts a reception process utilizing the line A, called by the step S524. A next step S554 outputs a signal "1" to the signal line 20a, thereby turning on the CML of the communication unit A. A step S556 executes a pre-process, then a step S558 enters the information of the signal lines 126a, 128a to discriminate whether the recording sheet is present in the first or second cassette, and the sequence proceeds to a step S560 or S574 respectively if the result is affirmative or negative.

The step S560 records the received information on the recording sheet of the first or second cassette, then a step S562 discriminates whether the reception of a page has been completed, and, if completed or not, the sequence respectively proceeds to a step S564 or the step S560.

The step S564 executes a mid-procedure, then a step S566 discriminates whether a next page is present, and, if present, the sequence proceeds to the step S558, but, if absent, the sequence proceeds to a step S568 for executing the post-procedure.

Then a step S570 outputs a signal "0" to the signal line 20a for turning off the CML of the communication unit A, and the sequence returns to the main flow from a step S572.

The step S574 stores the received information in the memory. At the same time there is stored information indicating that the information is received by the line A. A step S576 discriminates whether the reception of a page has been completed, and, if completed, the sequence proceeds to a step S580 for executing the post-process and then proceeds to a step S582. If the reception of a page has not been completed, the sequence proceeds to a step S578.

The step S578 discriminates whether there is no available memory capacity, namely whether the memory proxy reception can no longer be executed, and, if no memory capacity is available, the sequence proceeds to a step S586, but, if memory capacity is available, the sequence proceeds to the step S574.

The step S582 discriminates whether a next page is present, and, if present, the sequence proceeds to the step S574, but, if absent, the sequence proceeds to a step S584 for increasing the value of the line A empty counter by one and then to the step S568.

A step S586 enters the information of the signal lines 130a, 132a to discriminate whether the recording sheet is present in the third or fourth cassette, and, according as the result is affirmative or negative, the sequence proceeds to a step S588 or S602.

The step S588 records the information obtained by the memory proxy reception by the line A on the recording sheet of the third or fourth cassette, wherein a message "reception by the line A" is recorded on the first page of each communication. A step S590 stores the received information in the memory. At the same time, there is memorized a fact that this reception is by the line A.

A step S592 discriminates whether the reception of a page has been completed, and, if not completed, the sequence proceeds to the step S588, but, if completed, the sequence proceeds to a step S594 for executing an intermediate procedure.

A step S596 discriminates whether a next page is present, and, if present, the sequence proceeds to the step S588, but, if absent, the sequence proceeds to the step S598 for executing a post-procedure. Then a step S600 outputs a signal "0" to the signal line 20a for turning off the CML of the communication unit A and the sequence proceeds to a step S608.

The next step S602 outputs a signal "0" to the signal line 20a for turning off the CML. A step S604 executes an error process, and the sequence returns to the main flow from a step S606.

The step S608 increases the value of the line A empty counter by one. A step S612 displays, on the display circuit 236 through the signal line 220g, that the communication of a number (equal to the value of the line A empty counter) received by the line A has been outputted on the recording sheet to be used for the line B. Then the sequence returns to the main flow from a step S614.

A step S616 starts a reception process utilizing the line B, to be called from the step S528.

A sequence of steps S618 to S676 is same as the above-described sequence of the steps S554 to S614 except that the lines A and B are mutually inverted, also the communication units A and B are mutually inverted, the first and second cassettes and the third and fourth cassettes are mutually inverted, and the line A empty counter is replaced by the line B empty counter. Therefore the sequence will not be explained further.

In the facsimile apparatus with two lines, the foregoing embodiments facilitates the sorting of the received information in case the lines A and B are respectively used by different organizations, by employing different colors in the recording sheet set in the cassette to be used in the reception utilizing the line A and in the recording sheet set in the cassette to be used in the reception utilizing the line B, and also allows to continue the reception even in case the reception shifts to the memory reception because the cassette to be used in the reception utilizing the line A becomes empty and then the memory capacity thereafter becomes deficient. In such case, the recording is made on the recording sheet set in the cassette to be used in the reception utilizing the line B, but a message indicating that the reception is made by the line is recorded on the first page of each communication to facilitate the sorting of the information.

Also in the facsimile apparatus with two lines, by the foregoing embodiments, the user can recognize a communication in which the information received by the line A is recorded on the recording sheet to be used in the reception utilizing the line B and also can recognize the number of such communications, so that the received information can be securely sorted without error.

In the following there will be explained a fifth embodiment of the present invention.

In the fifth embodiment of the present invention, there is provided a facsimile apparatus connected to plural lines, capable of changing the cassette to be used for each job, corresponding to each line.

Figure 28:
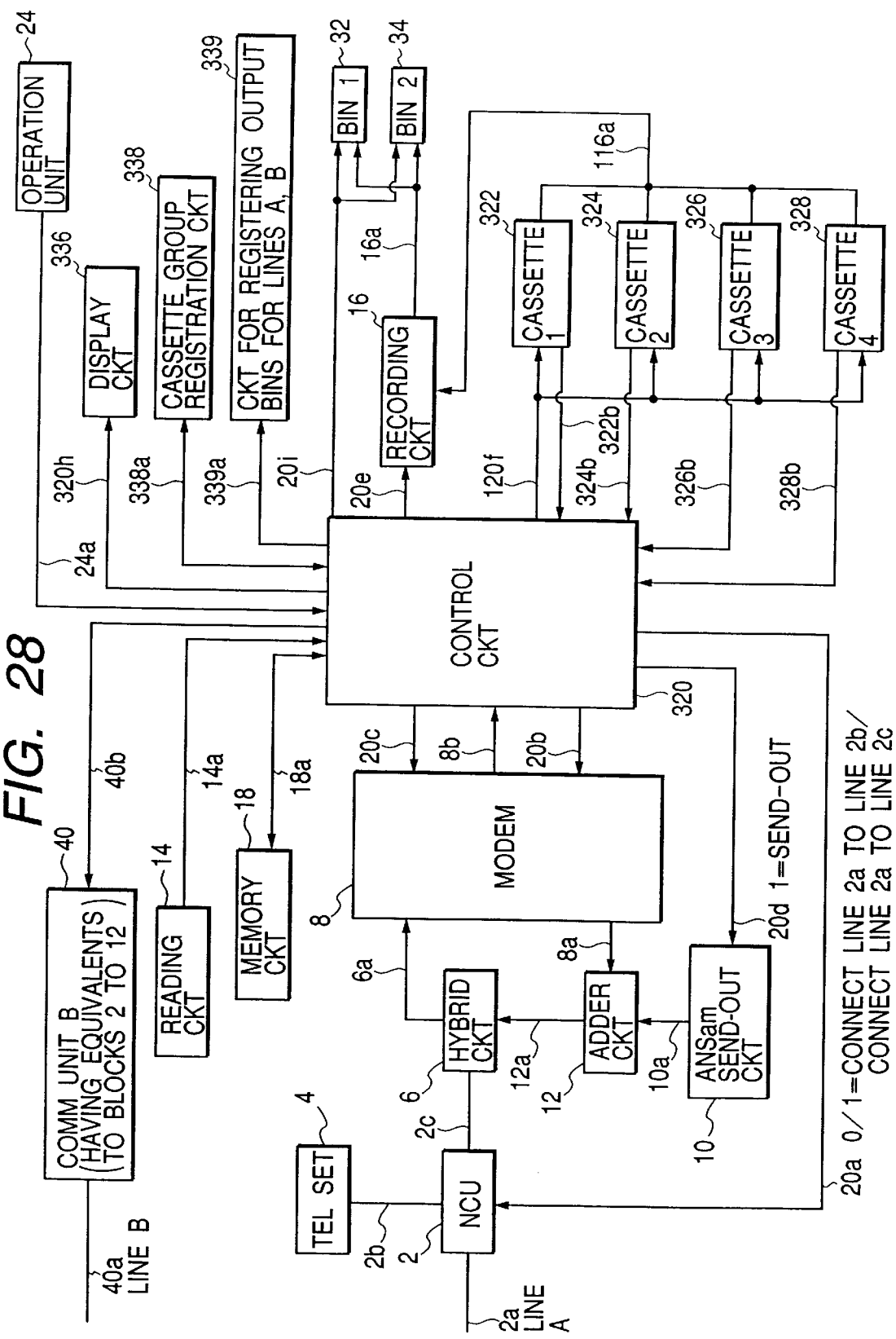
FIG. 28 is a block diagram showing a fifth embodiment of the present invention.

FIG. 28 is a block diagram showing the configuration of a facsimile apparatus constituting the fifth embodiment of the present invention.

In FIG. 28, components same as those in FIGS. 1 and 10 are represented by same numbers and will not be explained further.

A cassette 322 is the first cassette containing the recording sheet, and the information on the presence/absence of the recording sheet in the first cassette and on the surfacial reflective density of the recording sheet is outputted to a signal line 322b. Similarly, cassettes 324, 326, 328 are the second, third and fourth cassettes containing the recording sheets, and the information on the presence/absence of the recording sheet therein and on the surfacial reflective density of the recording density are outputted to signal lines 324b, 326b, 328b.

When a signal "1" is outputted to the signal line 120f, there is executed recording on the recording sheet contained in the first cassette. Similarly, when a signal "2", "3" or "4" is outputted to the signal line 120f, there is executed recording on the recording sheet contained respectively in the second, third or fourth cassette.

A display circuit 336 enters the information on a signal line 320h, and displays a message such as "Match the color of the recording sheet of the first cassette with that of the second cassette", "Set, in the third cassette, the recording sheet of a color same as that in the fourth cassette", or "Use, in the first and second cassettes, the recording sheet of a color different from that in the third and fourth cassettes".

A registration circuit 338 is used for registering cassette groups. The color of the recording sheet is made same within a same cassette group but different between the different cassette groups. As an example, there are registered, through a signal line 338a, a first cassette group consisting of the first and second cassettes, and a second cassette group consisting of the third and fourth cassettes.

A registration circuit 339 is used for registering output bins corresponding to the lines A and B. As an example, there are registered, through a signal line 339a, the first bin for output for the line A and the second bin for output for the line B.

A control circuit 320, in a facsimile apparatus with two lines (lines A and B), serves to register the output bin for each line (first bin for output for the line A and second bin for output for the line B) and for changing the cassette group to be used for each job (reception of a communication, output of the communication result report for each communication, and a job within the output of the communication results report of the communications of a predetermined number), corresponding to each line.

In the present description it is assumed that the first cassette group consists of the first and second cassettes and the second cassette group consists of the third and fourth cassettes. The color of the recording sheet is made different between different cassette groups. Also there is displayed whether the color of the recording sheet is same or not within a cassette group.

FIGS. 29 to 39 are flow charts showing the control sequence of the control circuit 320 in the present fifth embodiment.

Figure 29:
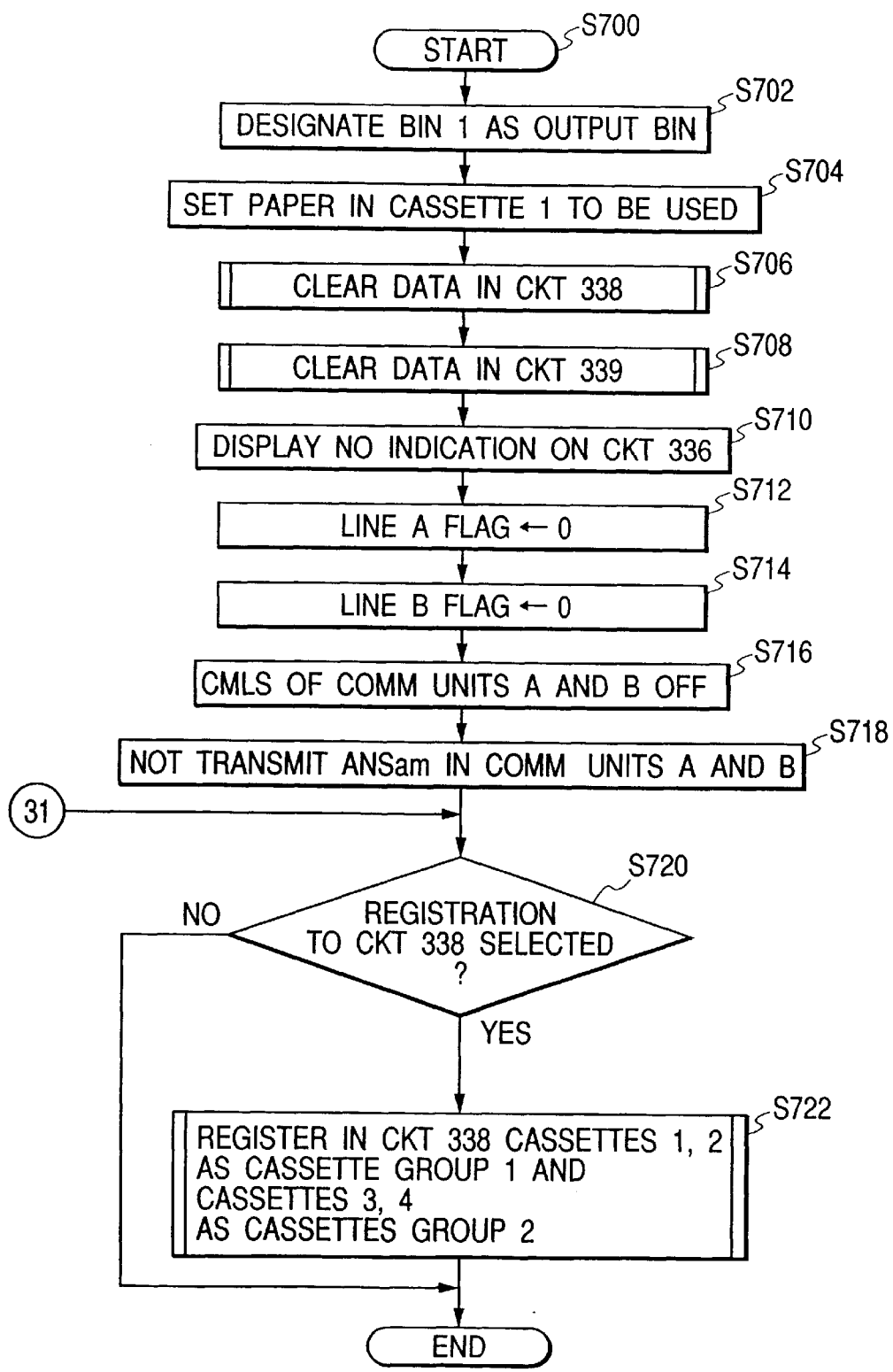
Figure 30:
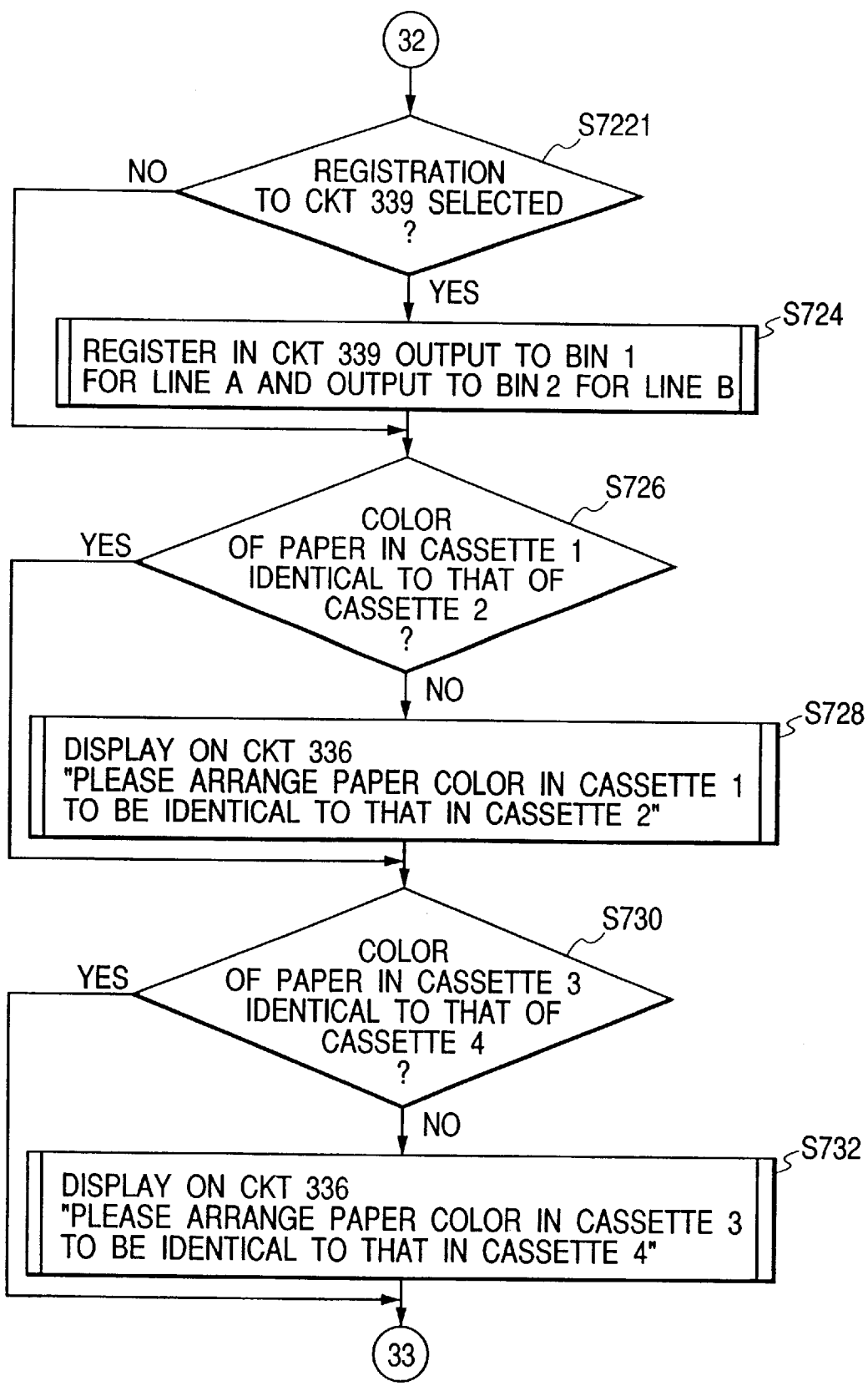
Figure 31:
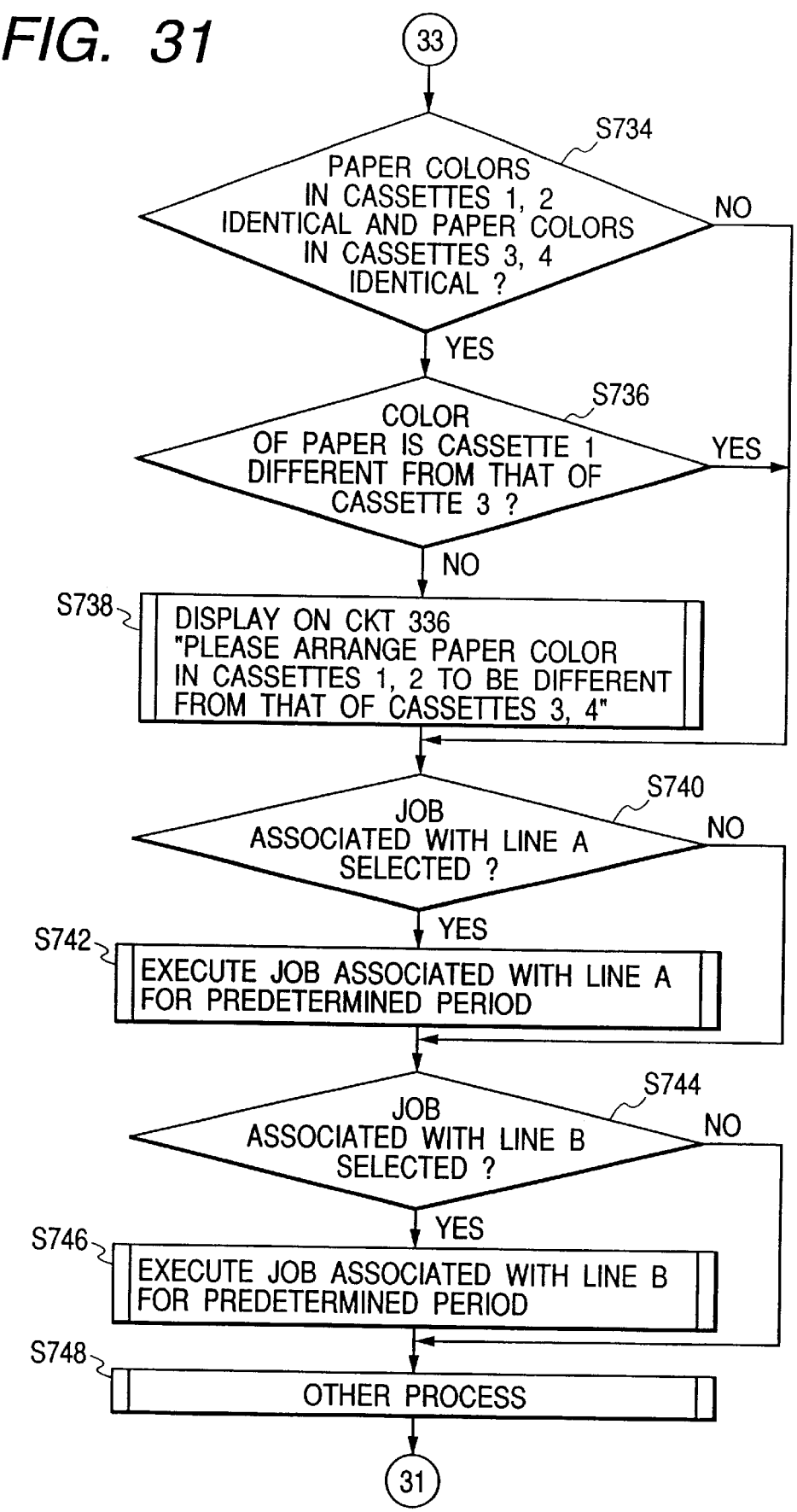
Figure 32:
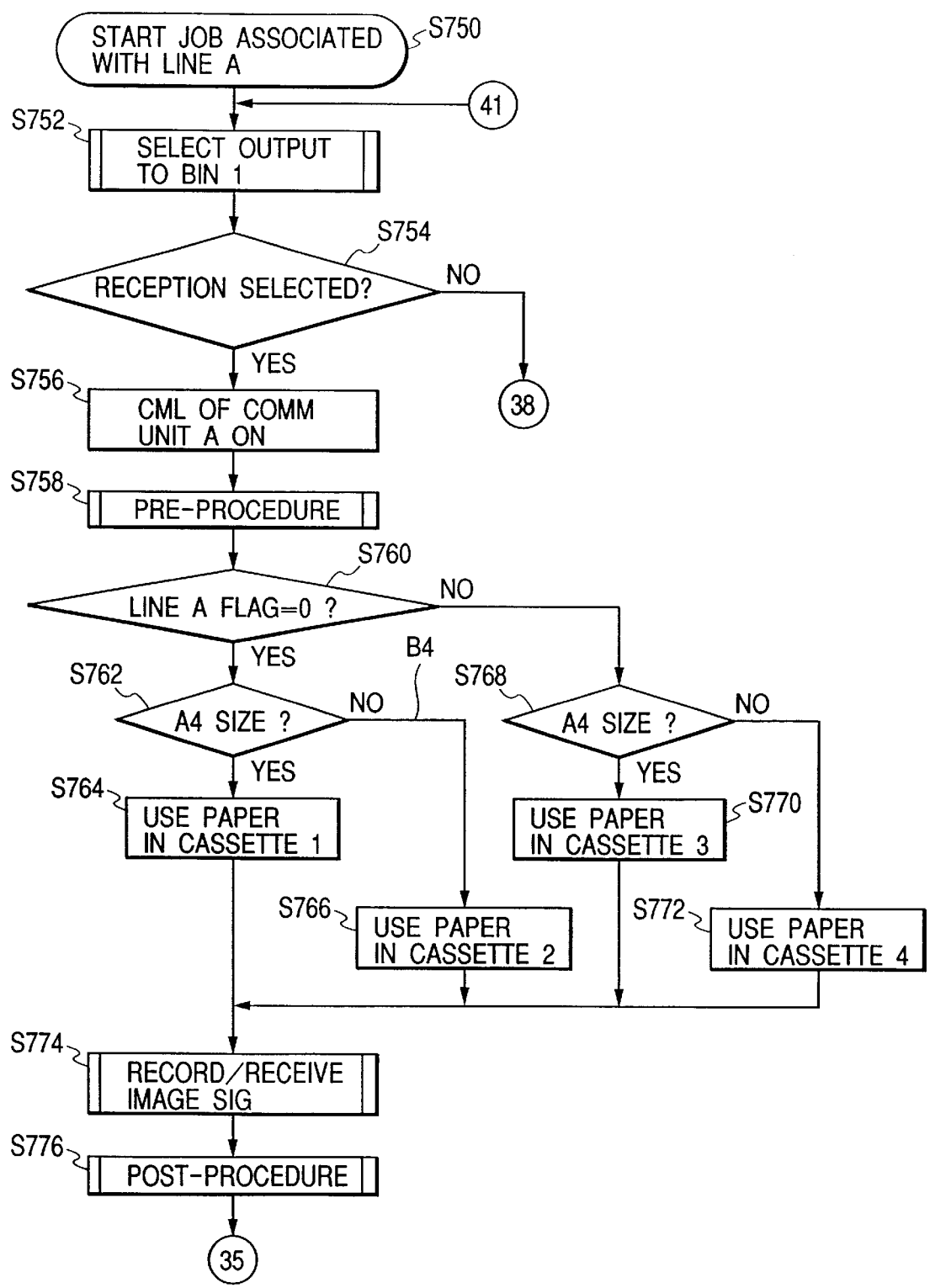
Figure 33:
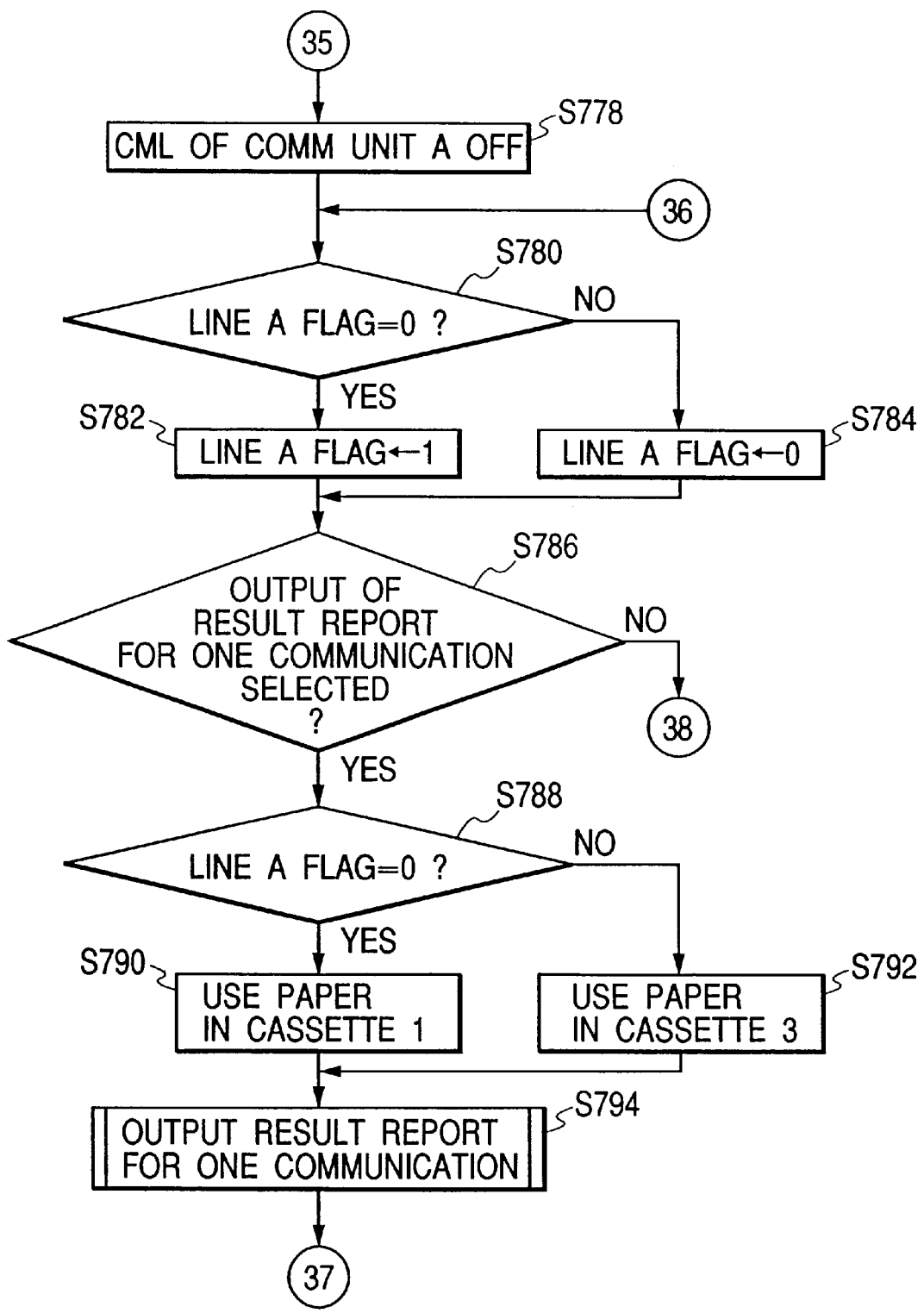
Figure 34:
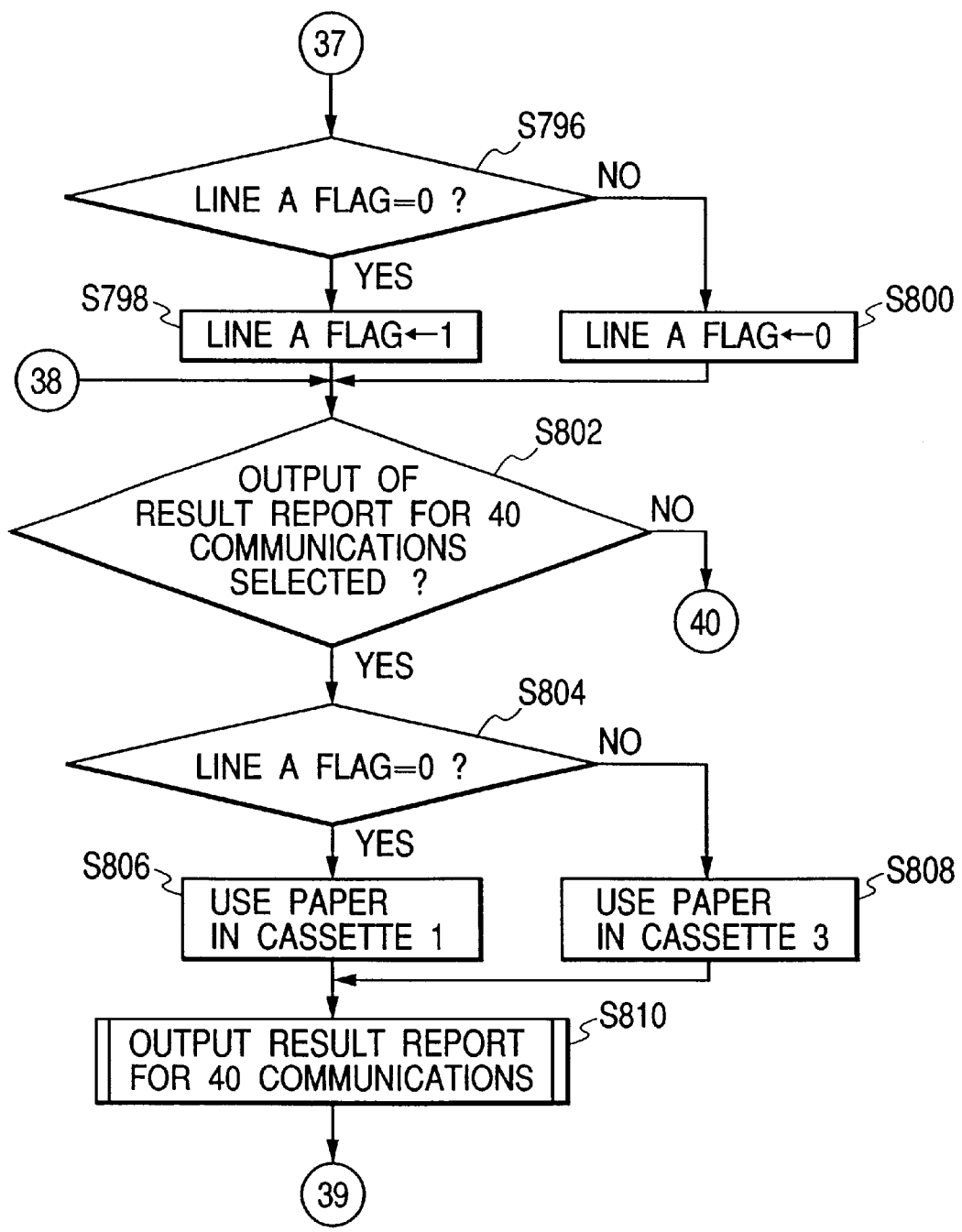
Figure 35:
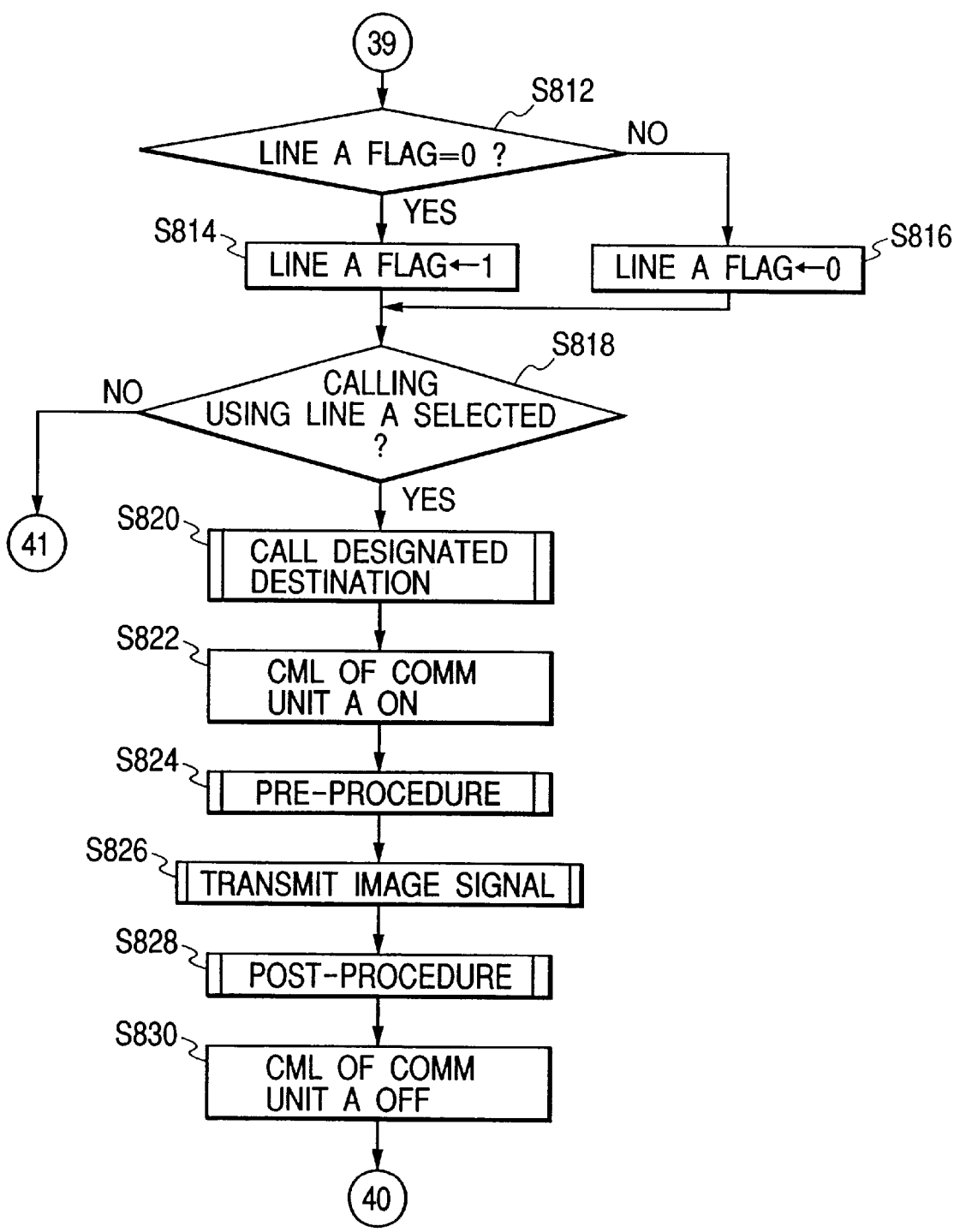
Figure 36:
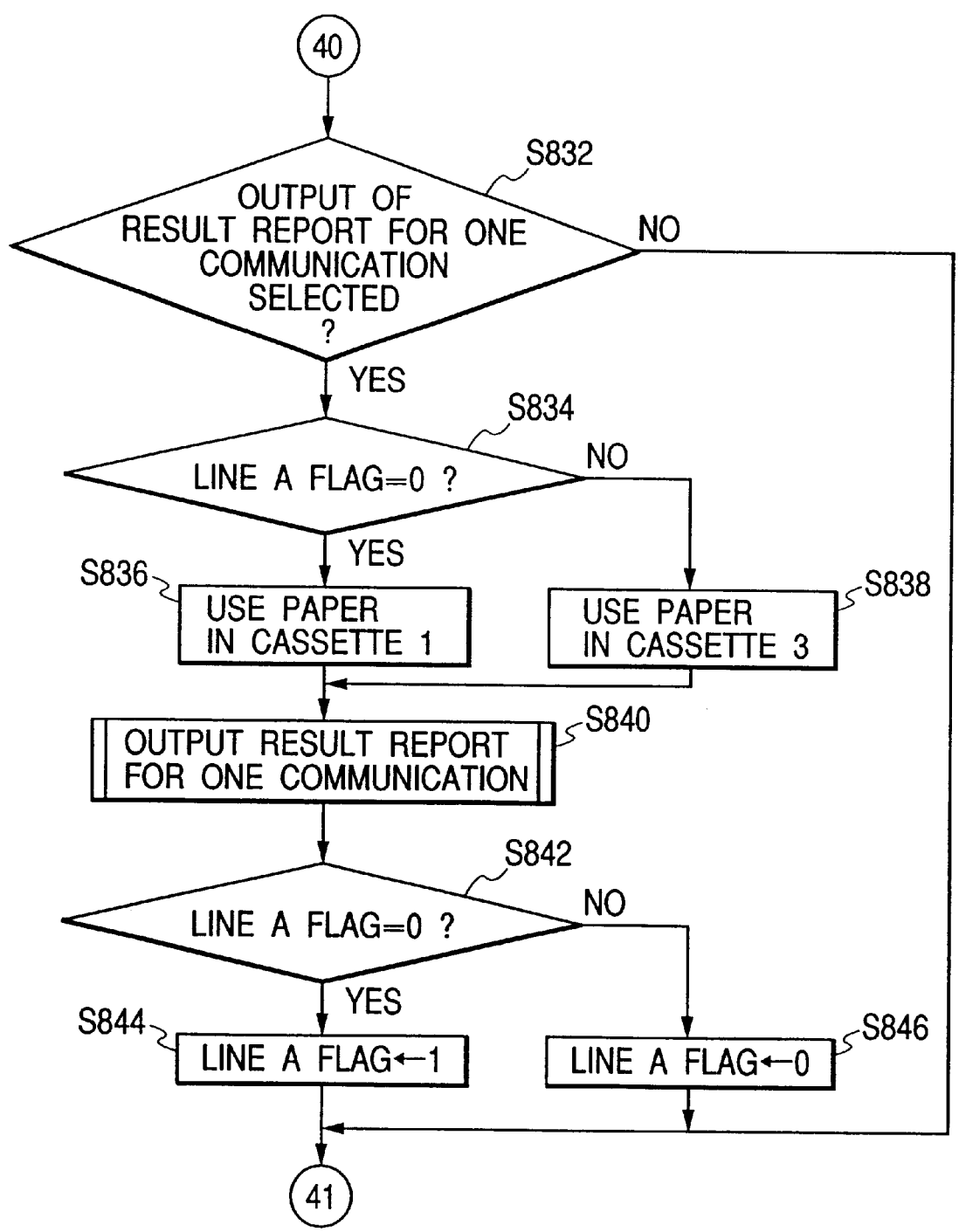
Figure 37:
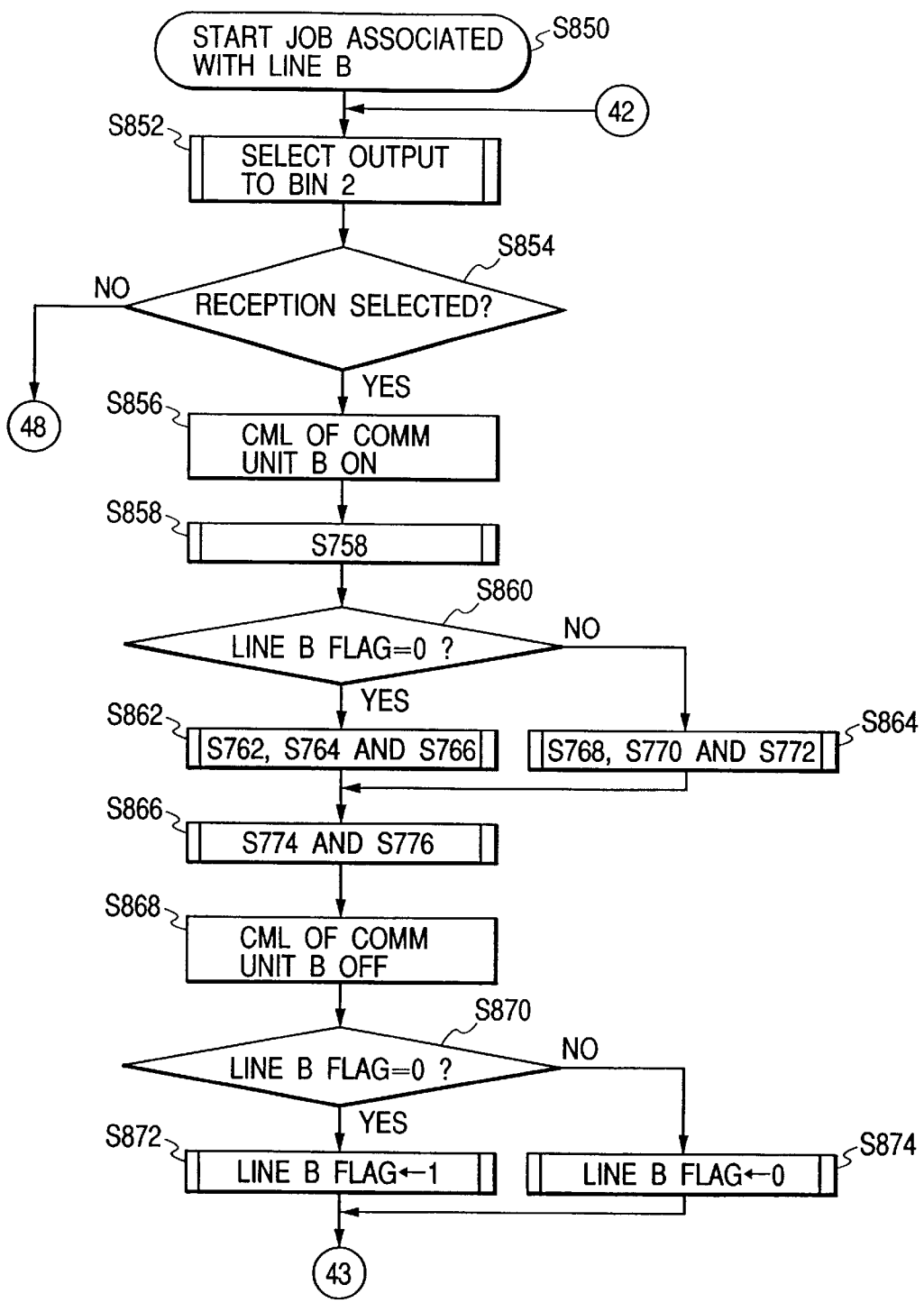
Figure 38:
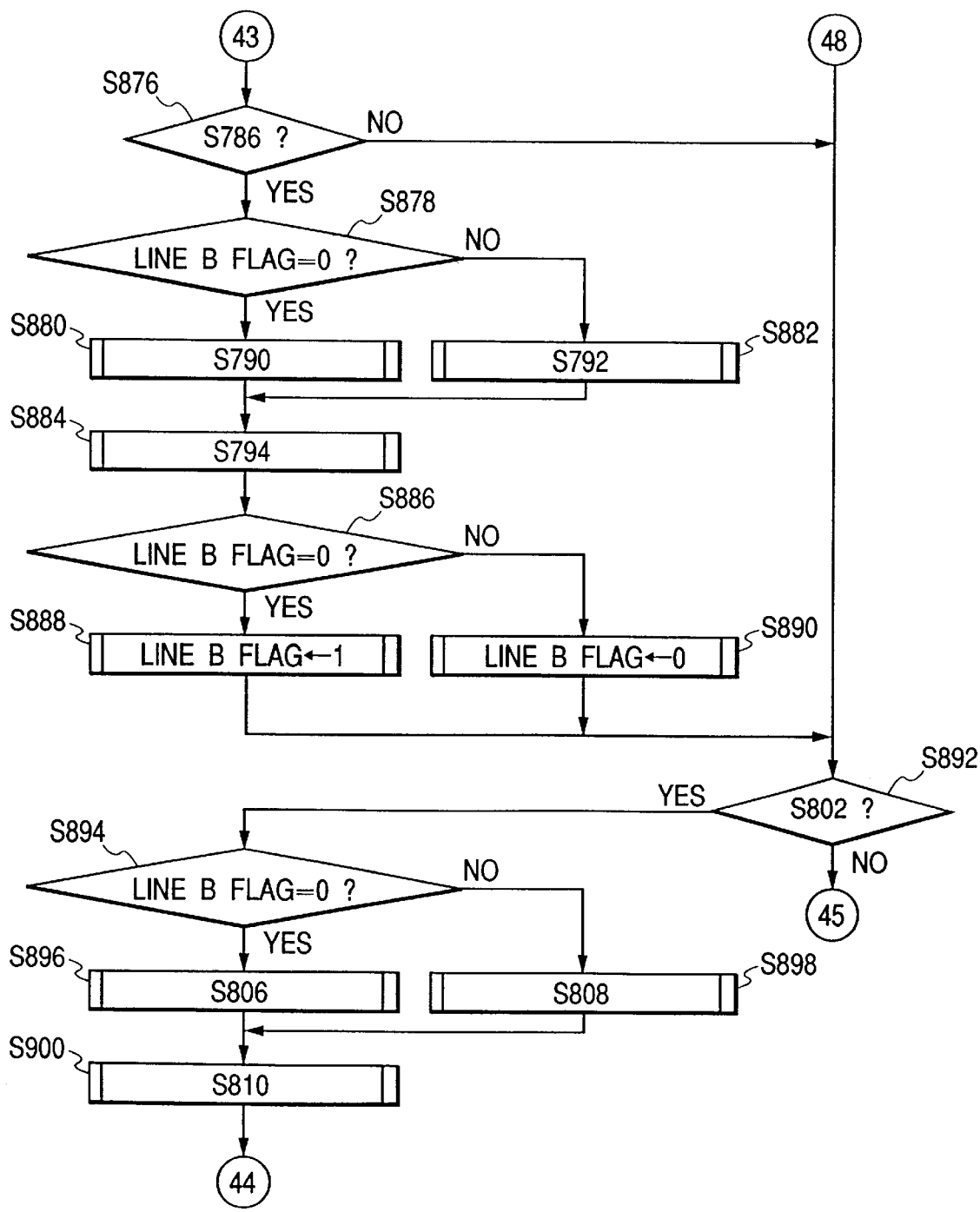

Referring to FIG. 29, a step S700 starts the sequence, and a step S702 outputs a signal "1" to the signal line 20$i$ for designating the output to the first bin. A step S704 outputs a signal "1" to the signal line 120$f$ for selecting the use of the recording sheet of the first cassette.

A step S706 clears the information of the registration circuit 338 through the signal line 338$a$, and a step S708 clears the information of the registration circuit 339 through the signal line 339$a$. A step S710 disables the display circuit 336 through the signal line 320$h$.

A step S712 sets "0" in a line A flag, for switching the cassette group to be used for output to the first bin. Also a step S714 sets "0" in a line B flag, for switching the cassette group to be used for output to the second bin.

A step S716 turns off the CML's of the communication units A and B, and a step S718 so sets the communication units A and B as not to transmit the ANSam signals.

A step S720 enters the information of the signal line 24$a$ for discriminating whether the registration to the registration circuit 338 is selected, and, if selected, the sequence proceeds to a step S722 for registering, in the registration circuit 338 through the signal line 338$a$, the first and second cassettes as the cassette group 1 and the third and fourth cassettes as the cassette group 2 and then to a step S7221. If the registration is not selected, the sequence proceeds directly to the step S7221.

The step S7221 enters the information of the signal line 24$a$ for discriminating whether the registration to the registration circuit 339 is selected, and, if selected, the sequence proceeds to a step S724 for registering, in the registration circuit 339 through the signal line 339$a$, the first bin for the output for the line A and the second bin for the output for the line B, and then to a step S726. If the registration is not selected, the sequence proceeds directly to the step S726.

The step S726 enters the information (information on the reflective density) of the signal lines 322$b$, 324$b$ for discriminating whether the recording sheets in the first and second cassettes have a same color, and, if same, the sequence proceeds to a step 730. If not same, the sequence proceeds to a step S728 for displaying, on the display circuit 336 through the signal line 320$h$, a message "Set the recording sheets of a same color in the first and second cassettes", and proceeds then to the step S730.

The step S730 enters the information (information on the reflective density) of the signal lines 326$b$, 328$b$ for discriminating whether the recording sheets in the third and fourth cassettes have a same color, and, if same, the sequence proceeds to a step S732. If not same, the sequence proceeds to the step S732 for displaying, on the display circuit 336 through the signal line 320$h$, a message "Set the recording sheets of a same color in the third and fourth cassettes", and proceeds then to a step S734.

The step S734 enters the information (information on the reflective density) of the signal lines 322$b$, 324$b$, 326$b$ and 328$b$ for discriminating whether the recording sheets in the first and second cassettes have a same color and whether the recording sheets in the third and fourth cassettes have a same color, and according as the result is affirmative or negative, the sequence proceeds to a step S736 or S740.

The step S736 enters the information (information on the reflective density) of the signal lines 322$b$, 326$b$ for discriminating whether the recording sheets in the first and third cassettes have a same color, and, if not same, the sequence proceeds to the step S740. If same, the sequence proceeds to a step S738 for displaying, on the display circuit 336 through the signal line 320$h$, a message "Use different colors for the recording sheets in the first and second cassettes and in the third and fourth cassettes", and proceeds then to the step S740.

The step S740 discriminates whether the job relating to the line A is already in selection or in the course of selection, and, if the result is affirmative, the sequence proceeds to a step S742 for executing the job relating to the line A for a predetermined time, and then to a step S744. If the result is negative, the sequence proceeds directly to the step S744.

The step S744 discriminates whether the job relating to the line B is already in selection or in the course of selection, and, if the result is affirmative, the sequence proceeds to a step S746 for executing the job relating to the line B for a predetermined time, and then to a step S748. If the result is negative, the sequence proceeds directly to the step S748. The step S748 executes other process and the sequence proceeds to the step S720.

A step S750 starts a job relating to the line A. A next step S752 outputs a signal "1" to the signal line 20$i$ for selecting the output to the first bin. Then a step S754 discriminates whether the reception by the line A is selected, and, if selected or not, the sequence proceeds respectively to a step S756 or S802.

The step S756 turns on the CML of the communication unit A, and a step S758 executes a pre-procedure. Then a step S760 discriminates whether the line A flag is 0, and according as it is 0 or 1, the sequence proceeds to a step S762 or S768.

The step S762 discriminates whether the received original is of A4 size, and, if A4 size, the sequence proceeds to a step S764 for outputting a signal "1" to the signal line 120$f$ for using the recording sheet of the first cassette. If it is of B4 size, the sequence proceeds to a step S766 for outputting a signal "2" to the signal line 120$f$ for using the recording sheet of the second cassette.

The step S768 discriminates whether the received original is of A4 size, and, if A4 size, the sequence proceeds to a step S770 for outputting a signal "3" to the signal line 120$f$ for using the recording sheet of the third cassette. If it is of B4 size, the sequence proceeds to a step S772 for outputting a signal "4" to the signal line 120$f$ for using the recording sheet of the fourth cassette.

Thereafter a step S774 executes reception/recording of the image signal, then a step S776 executes a post-procedure, and a step S778 turns off the CML of the communication unit A.

Then a step S780 discriminates whether the line A flag is 0, and, if 0, the sequence proceeds to a step S782 for setting the line A flag at 1, but, if the line A flag is 1, the sequence proceeds to a step S784 for setting the line A flag at 0.

Then a step S786 discriminates whether the output of the communication result report of a communication is selected, and according as selected or not, the sequence proceeds to a step S788 or the step S802.

The step S788 discriminates whether the line A flag is 0, and, if 0, the sequence proceeds to a step S790 for outputting a signal "1" to the signal line 120*f* for using the recording sheet of the first cassette. If the line A flag is 1, the sequence proceeds to a step S792 for outputting a signal "3" to the signal line 120*f* for using the recording sheet of the third cassette.

A step S794 outputs the communication result report of a communication. Then a step S796 discriminates whether the line A flag is 0, and, if 0, the sequence proceeds to a step S798 for setting the line A flag at 1, but, if the line A flag is 1, the sequence proceeds to a step S800 for setting the line A flag at 0.

Then the step S802 enters the information of the signal line 24*a* for discriminating whether the output of the communication result report of 40 communications is selected, and, according as selected or not, the sequence proceeds to a step S804 or S832.

The step S804 discriminates whether the line A flag is 0, and, if 0, the sequence proceeds to a step S806 for outputting a signal "1" to the signal line 120*f* for using the recording sheet of the first cassette. If the line A flag is 1, the sequence proceeds to a step S808 for outputting a signal "3" to the signal line 120*f* for using the recording sheet of the third cassette.

A step S810 outputs the communication result report of 40 communications. Then a step S812 discriminates whether the line A flag is 0, and, if 0, the sequence proceeds to a step S814 for setting the line A flag at 1, but, if the line A flag is 1, the sequence proceeds to a step S816 for setting the line A flag at 0.

Then a step S818 enters the information of the signal line 24*a* for discriminating whether a call by the line A is selected, and, if selected, the sequence proceeds to a step S820 for issuing a call to the designated destination. If not selected, the sequence proceeds to the step S752. A step S822 turns on the CML of the communication unit A.

A step S824 executes a pre-procedure, then a step S826 executes transmission of the image signal, a step S828 executes a post-procedure, and a step S830 turns off the CML of the communication unit A.

Then a step S832 discriminates whether the output of the communication result report of a communication is selected, and, if selected or not, the sequence proceeds respectively to a step S834 or the step S752.

The step S834 discriminates whether the line A flag is 0, and, if 0, the sequence proceeds to a step S836 for outputting a signal "1" to the signal line 120*f* for using the recording sheet of the first cassette. If the line A flag is 1, the sequence proceeds to a step S838 for outputting a signal "3" to the signal line 120*f* for using the recording sheet of the third cassette. Then a step S840 outputs the communication result report of a communication.

A step S842 discriminates whether the line A flag is 0, and, if 0, the sequence proceeds to a step S844 for setting the line A flag at 1, but, if the line A flag is 1, the sequence proceeds to a step S846 for setting the line A flag at 0.

A step S850 starts a job relating to the line B. A next step S852 outputs a signal "2" to the signal line 20*i* for selecting the output to the second bin. Then a step S854 discriminates whether the reception by the line B is selected, and, according as selected or not, the sequence proceeds respectively to a step S856 or S892.

The step S856 turns on the CML of the communication unit B, and a step S858 executes a process similar to that in the step S758. Then a step S860 discriminates whether the line B flag is 0, and, if it is 0, the sequence proceeds to a step S862 for executing a process similar to that in the aforementioned steps S762, S764 and S766, but, if it is 1, the sequence proceeds to a step S864 for executing a process similar to that in the aforementioned steps S768, S770 and S772.

Then a step S866 executes a process similar to that in the aforementioned steps S774 and S776, and a step S868 turns off the CML of the communication unit B. Then a step S870 discriminates whether the line B flag is 0, and, if 0, the sequence proceeds to a step S872 for setting the line B flag at 1, but, if the line B flag is 1, the sequence proceeds to a step S874 for setting the line B flag at 0.

Thereafter a step S876 executes discrimination similar to that in the aforementioned step S786, and the sequence proceeds to a step S878 or the step S892 according as the result is affirmative or negative.

Then the step S878 discriminates whether the line B flag is 0, and, if it is 0, the sequence proceeds to a step S880 (for a process similar to that in the step S790), but, if it is 1, the sequence proceeds to a step S882 (for a process similar to that in the step S792). Then a step S884 executes a process similar to that in the step S794. A step S886 discriminates whether the line B flag is 0, and, if 0, the sequence proceeds to a step S888 for setting the line B flag at 1, but, if the line B flag is 1, the sequence proceeds to a step S890 for setting the line B flag at 0.

Thereafter the step S892 executes discrimination similar to that in the step S802, and the sequence proceeds to the step S894 or a step S918 respectively if the result is affirmative or negative.

The step S894 discriminates whether the line B flag is 0, and, if it is 0, the sequence proceeds to a step S896 (for a process similar to that in the step S806), but, if it is 1, the sequence proceeds to a step S898 (for a process similar to that in the step S808).

Then a step S900 executes a process similar to that in the step S810. A step S902 discriminates whether the line B flag is 0, and, if 0, the sequence proceeds to a step S904 for setting the line B flag at 1, but, if the line B flag is 1, the sequence proceeds to a step S906 for setting the line B flag at 0.

Then a step S908 discriminates whether a call by the line B is selected, and the sequence proceeds to a step S910 (for a process similar to that in the step S820) or S852 according as it is selected or not.

The step S910 executes a process similar to that in the step S820, and a step S912 turns on the CML of the communication unit B. A step S914 executes a process of the steps S824 to S828, and a step S916 turns off the CML of the communication unit B.

Thereafter the step S918 executes discrimination similar to that in the step S832, and the sequence proceeds to a step S920 or S852 respectively if the result is affirmative or negative.

The step S920 discriminates whether the line B flag is 0, and, if it is 0, the sequence proceeds to a step S924 (for a process similar to that in the step S836), but, if it is 1, the sequence proceeds to a step S922 (for a process similar to that in the step S838), and proceeds then to the step S926.

The step S926 executes a process similar to the step S840. A step S928 discriminates whether the line B flag is 0, and if it is 0, the sequence proceeds to a step S930 to set the line B flag at 1, but if it is 1, the sequence proceeds to a step S932 to set the line B flag at 0. Thereafter, the sequence proceeds to the step S852.

It has been explained that the above-described functions of the control circuit are executed by a CPU therein according to a program stored in a ROM or a RAM provided in the control circuit, but it is also possible to store such program in an external memory medium such as a floppy disk, a hard disk, an optical disk, a CD-ROM or a memory card, to fetch the program by an exclusive reading device into the control circuit and to execute the program by the CPU provided therein.

Also the foregoing embodiments have been explained by a facsimile apparatus of stand-alone type, but the present invention is not limited to such embodiments and is likewise applicable to the data communication control in a comprehensive data processing system in which the copying function, electronic filing function and/or data processing function is combined with the communicating function.

According to the foregoing embodiments, in case of utilizing two lines A, B respectively by organizations a and b, it is rendered possible to change the output bin for the recorded sheet according to the organization, and to output, within each output bin, the different jobs such as the reception sheet, the communication result report of a communication and the communication result report of communications of a predetermined number on the recording sheets of respectively different colors, thereby easily achieving secure distribution of the reception records and improving the convenience of use.

Also the foregoing embodiments allow to securely output, within each bin, the reception sheet, the communication result report of a communication and the communication result report of communications of a predetermined number on the recording sheets of respectively different colors, whereby the convenience of use can be significantly improved.

What is claimed is:

1. A communication apparatus connectable to a plurality of lines, comprising:

a plurality of cassettes each adapted to contain recording sheets; and setting means for setting, for each line of the plurality of lines, a cassette to be used in a reception operation, wherein, in a case in which a cassette to be used corresponding to a line does not contain a recording sheet, received information is stored in a memory regardless of whether a cassette to be used corresponding to another line contains a recording sheet.

2. A communication apparatus according to claim 1, further comprising:

memory means for storing information regarding a line identified to be used in issuing a call; and report output means for outputting a report relating to a communication, by a recording sheet of a cassette set by said setting means, wherein the cassette is set for the line identified to be used in issuing a call according to the information stored in said memory means.

3. A communication apparatus according to claim 1, wherein said communication apparatus is a facsimile apparatus.

4. A communication apparatus connectable to a plurality of lines, comprising:

a plurality of output bins each adapted to output a recording sheet on which received information is recorded;

registration means for registering an output bin for each of the plurality of lines;

a plurality of cassettes each adapted to contain a recording sheet; and alteration means for altering a cassette used in each job, corresponding to each line of the plurality of lines, wherein an output bin for outputting a recorded sheet is changed for each line, and wherein a cassette group to be used for each job is changed within each output bin.

5. A communication apparatus according to claim 4, wherein a job includes at least one of: reception of a communication, output of a communication result report of a communication, and output of a communication result report of communications of a predetermined number.

6. A communication apparatus connectable to a plurality of lines, comprising:

a plurality of output bins each adapted to output a recording sheet on which received information is recorded;

registration means for registering an output bin for each of the plurality of lines;

a plurality of cassettes each adapted to contain a recording sheet; and alteration means for altering a cassette used in each job, corresponding to each line of the plurality of lines, wherein a color of a recording sheet is changed according to a cassette group.

7. A communication apparatus according to claim 6, wherein, in a case in which a color of a recording sheet is not a same color within a cassette group, there is displayed such a fact.

8. A communication apparatus according to claim 6, wherein, in a case in which a color of a recording sheet is a same color in different cassette groups, there is displayed such a fact.

9. A communication method of a communication apparatus connectable to a plurality of lines, said method comprising the steps of:

providing a plurality of cassettes each adapted to contain recording sheets; and setting, for each line of the plurality of lines, a cassette to be used in a reception operation, wherein, in a case in which a cassette to be used corresponding to a line does not contain a recording sheet, received information is stored in a memory regardless of whether a cassette to be used corresponding to another line contains a recording sheet.

10. A communication method according to claim 9, further comprising the steps of:

storing information regarding a line identified to be used in issuing a call; and outputting a report relating to a communication, by a recording sheet of a cassette set in said setting step, wherein the cassette is set for the line identified to be used in issuing a call according to the information stored in said storing step.

11. A communication method according to claim 9, wherein the communication apparatus is a facsimile apparatus.

12. A communication method of a communication apparatus connectable to a plurality of lines, said method comprising:

providing a plurality of output bins each adapted to output a recording sheet on which received information is recorded;

registering an output bin for each of the plurality of lines;

providing a plurality of cassettes each adapted to contain a recording sheet; and altering a cassette used in each job, corresponding to each line of the plurality of lines, wherein an output bin for outputting a recorded sheet is changed for each line, and wherein a cassette group to be used for each job is changed within each output bin.

13. A communication method according to claim 12, wherein a job includes at least one of: reception of a communication, output of a communication result report of a communication, and output of a communication result report of communications of a predetermined number.

14. A communication method of a communication apparatus connectable to a plurality of lines, said method comprising:

providing a plurality of output bins each adapted to output a recording sheet on which received information is recorded;

registering an output bin for each of the plurality of lines;

providing a plurality of cassettes each adapted to contain a recording sheet; and altering a cassette used in each job, corresponding to each line of the plurality of lines, wherein a color of a recording sheet is changed according to a cassette group.

15. A communication method according to claim 14, wherein, in a case in which a color of a recording sheet is not a same color within a cassette group, there is displayed such a fact.

16. A communication method according to claim 14, wherein, in a case in which a color of a recording sheet is a same color in different cassette groups, there is displayed such a fact.

* * * * *